US009197617B1

(12) United States Patent
Millwood et al.

(10) Patent No.: US 9,197,617 B1
(45) Date of Patent: *Nov. 24, 2015

(54) CLIENT DEVICE CONNECTIVITY WITH INTEGRATED BUSINESS RULES

(75) Inventors: Lorne A. Millwood, Seattle, WA (US); Xavier Federico Lopez Suarez, Seattle, WA (US); Peter F. Hill, Seattle, WA (US); Donald Ryan Willhoit, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 648 days.

This patent is subject to a terminal disclaimer.

(21) Appl. No.: 12/969,202

(22) Filed: Dec. 15, 2010

(51) Int. Cl.
*G06F 15/16* (2006.01)
*H04L 29/06* (2006.01)
*H04J 1/16* (2006.01)
*H04W 24/00* (2009.01)

(52) U.S. Cl.
CPC .............. *H04L 63/08* (2013.01); *H04L 29/06* (2013.01)

(58) Field of Classification Search
CPC ....... H04L 63/08; H04L 63/028; H04L 29/06; H04L 63/0428; H04L 69/329
USPC ................ 709/218, 229; 370/230; 455/456.1; 726/1, 2, 22, 26
See application file for complete search history.

(56) References Cited

U.S. PATENT DOCUMENTS

| | | | |
|---|---|---|---|
| 5,875,237 A * | 2/1999 | Bolinger, Jr. | ......... H04M 15/07 379/114.14 |
| 6,473,800 B1 | 10/2002 | Jerger et al. | |
| 7,054,925 B2 | 5/2006 | Bauman et al. | |
| 7,564,872 B1 * | 7/2009 | Chawla | ............... H04L 12/5695 370/468 |
| 8,160,120 B2 * | 4/2012 | Ineichen | ................ G08C 17/02 375/132 |
| 8,515,015 B2 * | 8/2013 | Maffre | ................ H04L 12/2697 379/10.01 |
| 8,606,314 B2 * | 12/2013 | Barnes, Jr. | ......... G06Q 10/1053 370/338 |
| 8,806,041 B1 * | 8/2014 | Lopez Suarez | ....... H04L 63/102 709/227 |
| 2002/0010865 A1 | 1/2002 | Fulton et al. | |
| 2002/0169878 A1 | 11/2002 | Orenshteyn | |
| 2002/0184354 A1 | 12/2002 | McKenzie et al. | |
| 2003/0074486 A1 | 4/2003 | Anastasiadis et al. | |
| 2003/0097488 A1 | 5/2003 | Bauman et al. | |
| 2004/0209569 A1 | 10/2004 | Heinonen et al. | |

(Continued)

OTHER PUBLICATIONS

Office action for U.S. Appl. No. 12/969,260, mailed on Jun. 20, 2013, Lopez Suarez et al., "Client Device Connectivity with Integrated Business Rules and Multiple Network Types," 25 pages.

(Continued)

*Primary Examiner* — David Lazaro
*Assistant Examiner* — Vitali Korobov
(74) *Attorney, Agent, or Firm* — Lee & Hayes, PLLC; Shivshanker S. Naimpally

(57) ABSTRACT

Applications executing on mobile client devices may access remote resources via network connections. Operational capabilities and financial costs of these connections may differ. Developers, network administrators, and other parties may wish to moderate usage of various available conditions to conform to business rules. Connectivity information including one or more network grants are integrated into an application received from a developer at ingestion by an application management server, which accesses those business rules. The client devices may coordinate with a proxy server to provide additional controls. Networking public interfaces provide the developer with a simplified pathway for development of applications which use network connections, particularly on mobile devices.

32 Claims, 15 Drawing Sheets

(56) References Cited

U.S. PATENT DOCUMENTS

| | | |
|---|---|---|
| 2006/0047768 A1 | 3/2006 | Gellens |
| 2006/0209794 A1* | 9/2006 | Bae .................... H04L 12/6418 370/352 |
| 2007/0174521 A1* | 7/2007 | Aritomi .................. H04L 67/02 710/62 |
| 2007/0239721 A1 | 10/2007 | Ullman et al. |
| 2007/0276925 A1 | 11/2007 | La Joie et al. |
| 2007/0287473 A1* | 12/2007 | Dupray .................. H04W 4/02 455/456.1 |
| 2008/0004009 A1 | 1/2008 | Caldwell et al. |
| 2008/0120698 A1* | 5/2008 | Ramia .................... H04L 63/08 726/4 |
| 2008/0133708 A1* | 6/2008 | Alvarado ............. G06Q 10/109 709/218 |
| 2008/0232561 A1* | 9/2008 | Hildreth ................ G06Q 30/02 379/88.22 |
| 2009/0083115 A1 | 3/2009 | Pearson et al. |
| 2009/0253459 A1* | 10/2009 | Naganuma .......... H04B 1/0475 455/556.1 |
| 2009/0287617 A1 | 11/2009 | Schmidt |
| 2010/0042735 A1* | 2/2010 | Blinn .................. H04L 63/0815 709/229 |
| 2010/0180016 A1* | 7/2010 | Bugwadia ............. G06F 9/4411 709/220 |
| 2011/0138064 A1 | 6/2011 | Rieger et al. |
| 2011/0149956 A1* | 6/2011 | Alt ...................... H04L 63/0281 370/352 |
| 2011/0271289 A1 | 11/2011 | Weiser et al. |
| 2012/0016999 A1 | 1/2012 | Kieselbach et al. |
| 2012/0057456 A1* | 3/2012 | Bogatin ................ H04W 28/08 370/230.1 |
| 2012/0137213 A1* | 5/2012 | Hayler ................ G06F 12/1466 715/239 |

OTHER PUBLICATIONS

Office action for U.S. Appl. No. 12/969,260, mailed on Dec. 21, 2012, Lopez Suarez et al., "Client Device Connectivity with Integrated Business Rules and Multiple Network Types", 19 pages.

"WICD Core 1.0", <<http://www.w3.org/TR/2010/NOTE-WICD-20100819/>>, W3C, Aug. 2010, 49 pages.

Office Action for U.S. Appl. No. 12/969,260, mailed on Nov. 27, 2013, Xavier Federico Lopez Suarez, "Client Device Connectivity with Integrated Business Rules and Multiple Network Types," 24 pages.

Office Action for U.S. Appl. No. 14/324,986, mailed on Mar. 13, 2015, Xavier Federico Lopez Suarez, "Client Device Connectivity with Integrated Business Rules and Multiple Network Types", 13 pages.

* cited by examiner

US 9,197,617 B1

CLIENT DEVICE CONNECTIVITY WITH INTEGRATED BUSINESS RULES

BACKGROUND

Client devices such as eBook readers, cellular telephones, portable media players, tablet computers, netbooks, and the like, may execute applications to provide various functionalities desired by a user. The applications may be designed to connect the client device to remote devices, such as servers, via one or more networks. While it may be desirable to have these applications conform to one or more business rules, designing and deploying such applications has proven to be difficult and prone to error. As a result, improperly designated applications may be prone to failure, or may place unexpected or undesired demands on networks.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
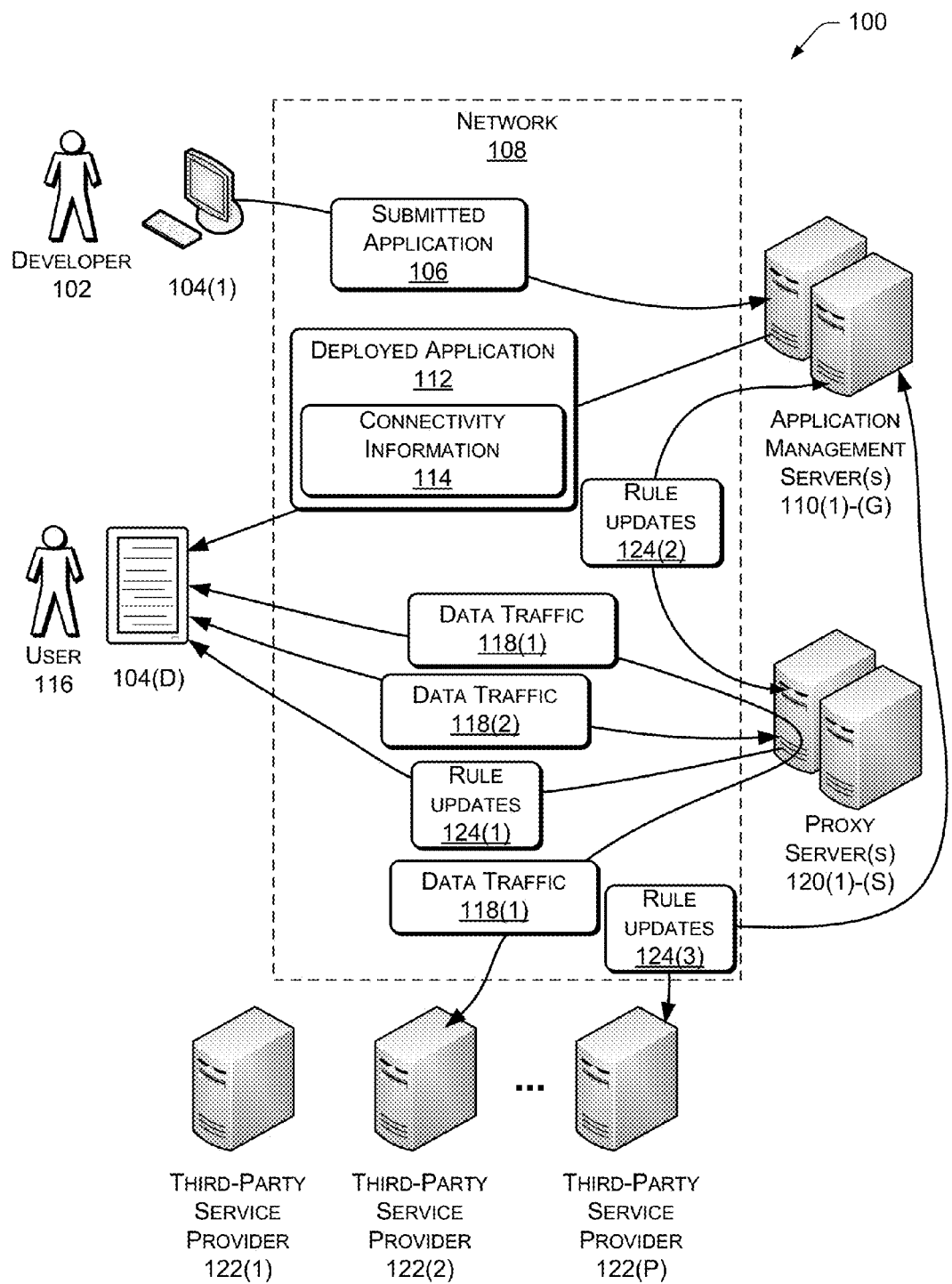
FIG. 1 is a block diagram of an illustrative network architecture configured to provide client device connectivity with integrated business rules using connectivity information in conjunction with a client-side connectivity module.

The use of applications on client devices, both mobile and stationary, continues to proliferate in terms of the volume of applications created, the numbers of devices that present these applications, and the numbers of users who are accessing these applications. Frequently, these applications will communicate with remote devices, such as a server, during operation. These communications may take place via network connections such as wireless wide area networks ("WWAN"), wireless local area networks ("WLANs"), wireless regional area networks ("WRAN"), and so forth. Operational capabilities and financial costs of these connections may differ. For example, a WWAN may have broader geographic coverage, but provide lower bandwidth than the WLAN. Additionally, costs associated with these different networks may vary significantly. For example, the WWAN connection may charge by the amount of data transferred, while the WLAN might not. As a result, developers, network administrators, and other parties may wish to moderate usage of various available conditions to conform to business rules. For example, business rules may specify that a bandwidth-intensive application operate on the WLAN rather than the WWAN.

This disclosure describes techniques and system that integrate business rules into connectivity between client devices and remote devices, such as servers. These integrated business rules in the form of configured connectivity information which is incorporated into the deployed application at ingestion, such that circumvention or modification of those business rules becomes impractical or impossible. The business rules may be updated or modified or additionally enforced with the use of a proxy server.

A set of networking public interfaces aid development of robust and reliable applications by providing straightforward and easy to use interfaces and application programming interfaces ("APIs"). The developer may use these tools to have the active content module in the application call various communication-related functions. The network public interfaces streamline development while also ensuring that business rules are integrated tightly into the resultant deployed application.

A developer provides a submitted application to an application management server. The application management server processes the submitted application to incorporate connectivity information which provides for one or more network grants and signatures. The network grants set forth the permissions which allow a deployed application to utilize communication functions available on the device while the signatures provide for authentication, encryption, and so forth. The process of taking the submitted application and preparing it for deployment is known as "ingestion."

Once the ingestion process is complete, a resulting deployed application is available to end users. During use, the deployed application may attempt to communicate with remote devices, such as third-party servers. For example, an application may be configured to download and present current scores from sporting events. The deployed application on the client device may use the network grants available within the connectivity information to request communication with the third-party server. The request for communication may be sent from the client device to a proxy server, which determines if communication is permitted. When communication is permitted, the proxy allows the client device to connect.

The proxy server may exchange business-rule information with the application management server or other servers, as well as the client device. These business rules provide details about privileges or restrictions associated with an application, user, device, and so forth. For example, due to business rules, such as terms of a licensing agreement, service level agreements, and so forth, the deployed application providing scores may be unavailable while the device is outside of a specified national boundary, such as the United States. As a result, the client-side connectivity module using the connectivity information, proxy server, or both in combination may prevent communication when the client device is in another country. The deployed application may, or may not, remain available to operate in a standalone or non-network mode until returning to the United States. The client device coordinates with a proxy server to enforce business rules.

Example System Architecture and Ingestion

FIG. 1 is a block diagram of an illustrative network architecture 100 configured to provide client device connectivity with integrated business rules. A developer 102 may use an electronic device, such as a client device 104(1), to create an application. For illustrative purposes only, and not by way of limitation, the client device 104 may be configured to execute a Linux®-based operating system and execute applications within the Sun Microsystems Java™ environment, or a Java™ derivative. In other implementations other environments and languages may be used, for example C++, C#, Python, and so forth.

The developer 102 may transmit the created application as a submitted application 106 via a network 108, storage media, and so forth, to application management servers 110(1), 110(2), . . . , 110(G). The network 108 may be implemented as one or more various networks, such as the Internet, a cable television network, wireless network, wired network, wireless wide area network, and so forth. The application management servers 110(1)-(G) may comprise a single server, cluster of servers, data center, virtualized instances, and so forth.

The application management servers 110(1)-(G) are configured to accept submitted applications 106 and handle ingestion of those submitted applications 106. Ingestion includes the assessment, approval, and modification of a submitted application 106 to form a deployed application 112. For example, the submitted application 106 may be assessed to confirm compatibility with a particular model of client device 104, such as an eBook reader device, to provide compliance with the business rules. These business rules may be specific to a particular application, particular to a developer 102, global across all applications and developers, or combinations thereof.

Modifying the submitted application 106 includes integrating connectivity information 114 with the submitted application 106. The connectivity information 114 contains one or more network grants for use of particular transport mechanisms on the client device, signatures, and so forth that provide for enforcement and maintenance of the business rules by the client-side connectivity module. The connectivity information 114 and its interaction with network public interfaces such as a connectivity application programming interface (API) is discussed in more detail below with regards to FIG. 4. Briefly, the connectivity information 114 provides access grants which are assessed by a client-side connectivity module to determine what communication resources the deployed application is permitted to use on the client device. The deployed application 112 interacts with the client-side connectivity module via a set of networking public interface, also known as the "connectivity API." The various networking components necessary for communication using the network interfaces available on the device, but the permissions to use them are provided within the connectivity information 114. For example, the submitted application 106 may be permitted by business rules to use only a WLAN connection, and thus the connectivity information 114 may provide network grants necessary for WLAN connectivity, and not WWAN connectivity.

In some implementations the application management servers 110(1)-(G) may also be configured to provide for ongoing management, provisioning, administration, and other functions associated with the deployed applications 112. For example, the application management servers 110(1)-(G) may provide for provisioning and distribution of deployed application 112 to the client device 104(D) for use by a user 116. The user 116 may then use the deployed application 112.

During operation, the deployed application 112 may attempt to communicate with a remote device such as a server, another type of remote device, and so forth. Subject to the constraints of the business rules and the network grants incorporated into the connectivity information 114, the deployed application 112 executing at least in part upon the client device 104 may thus generate data traffic 118. The data traffic 118 may first be sent to proxy servers 120(1), 120(2), . . . , 120(S). The proxy servers 120(1)-(S) may then determine whether to allow the communication. The data traffic 118 may also comprise traffic from the proxy server 120 to the client device 104. The proxy servers 120(1)-(S) are discussed in more detail below with regards to FIGS. 14 and 15. Briefly, the proxy servers 120(1)-(S) may work alone or in conjunction with the application management servers 110(1)-(G), client devices 104, or combinations thereof to enforce usage privileges associated with the deployed application 112, users 116, devices 104, and so forth.

When the proxy servers 120(1)-(S) permit communication, such as shown with data traffic 118(1), communication may be established with a third-party service provider 122(1), 122(2), . . . , 122(P). These third-party service providers 122(1)-(P) may be associated with the same or separate entities which own, manage, or administer the application management servers 110, the proxy servers 120, or both. The third-party service providers 122 provide services that support the deployed application 112. These may be services that are specific to the deployed application 112, such as a particular data stream of sports scores, or general services such as serving a web page.

When the proxy servers 120 deny communication, such as shown with data traffic 118(2), communication with the third-party service provider 122 via the proxy server 120 is not permitted. In some implementations, the client device 104 may be configured to communicate directly with the third-party service provider 122. In such an implementation, the connectivity information 114 on the client device 104 and client-side connectivity module may still enforce the business rules, and may also be configured to check with the application management servers 110 or the proxy servers 120 to receive updated business rules.

As described below, the proxy servers 120 may provide information to the deployed application 112 installed on the device 104 regarding a change in business rules with rule updates 124. For example, the proxy server 120 may notify the client-side connectivity module coupled with the deployed application 112 on the client device 104 of a rule update 124(1) that specifies communication is disallowed until a specific date and time. Thus, the connectivity information 114 may restrict communication attempts and prevent consumption of network 108 resources until that specific date and time has been reached, reducing useless traffic on the network 108. This also reduces the load on the proxy server 120. Rule updates 124 may be exchanged between any of the devices within the architecture. For example, the application management servers 110 may exchange rule updates 124(2) with the proxy servers 120, rule updates 124(3) with the third-party service providers 122, and so forth.

Figure 2:
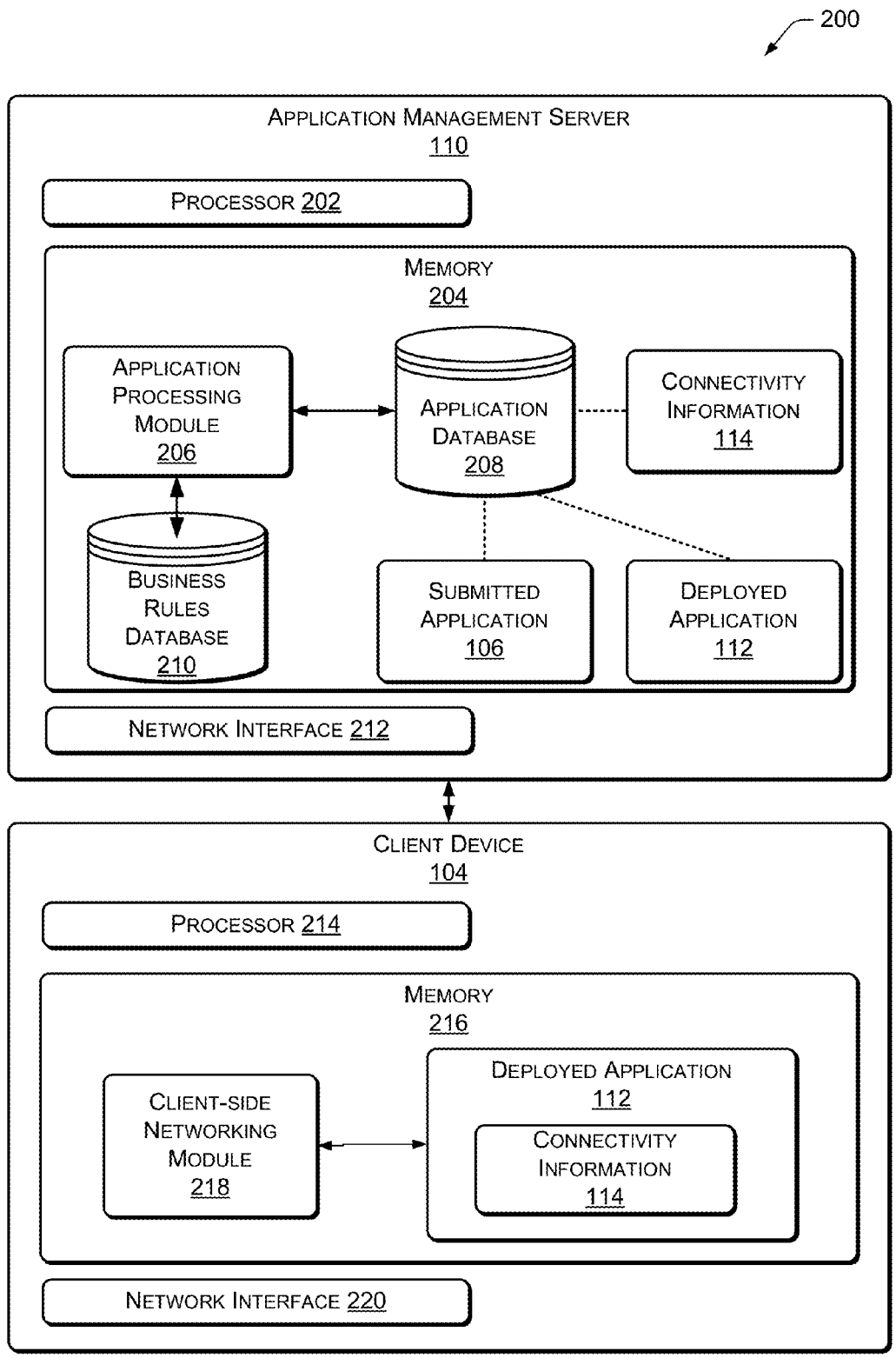
FIG. 2 is a block diagram of an illustrative architecture of an application management server and client device configured to provide client device connectivity with integrated business rules.

FIG. 2 is a block diagram of an illustrative architecture 200 of an application management server 110 and client device 104 configured to provide client device connectivity with integrated business rules. As depicted here, the application management server 110 comprises a processor 202 configured to execute instructions and coupled to a memory 204. In some implementations the functions of the application management server 110 may be distributed across a plurality of devices, such as in a cloud computing environment. For example, the application management server 110 may comprise a plurality of individual servers configured to perform the functions of the modules described herein.

The memory 204 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

The memory 204 may store or otherwise have access to an application processing module 206. The application processing module 206 is configured to handle ingestion tasks, which include receiving a submitted application 106, analyzing the requirements of the submitted application 106, determining communication requirements of the submitted application 106, determining business rules associated with the submitted application, and providing a connectivity module 104 configured to support the business rules. Ingestion may be automated, manual, or include some automatic and manual operations. For example, a human administrator may interpret particular contractual business rules to which the application provided by the developer 102 is subject to.

The application processing module 206 interacts with an application database 208. The application database 208 stores applications and data relating to those applications. As shown here, the application database 208 may include the submitted application 106, the deployed application 112, and the connectivity information 114 which is associated with the deployed application 112.

A business rules database 210 is also coupled to the application processing module 206. The business rules database 210 may contain business rules ranging from those which are global across the entire architecture to specific rules associated with a particular user account when using a particular client device 104. These business rules may also codify contractual requirements for service, service guarantees, limitations, and so forth.

Within the application management server 110 is a network interface 214, also coupled to the processor 202. This network interface 214 allows the application management server 110 to couple to other servers or devices.

Also shown in this illustration is a block diagram of the client device 104. The client device 104 may include eBook readers, cellular telephones, portable media players, tablet computers, netbooks, desktops, virtual sessions, and so forth. The client device 104 may include a processor 214 coupled to a memory 216. The memory 216 may store the deployed application 112, or a portion thereof, as well as an associated connectivity information 114. Coupled to the deployed application 112 is a client side-networking module 218. The client-side networking module 218 is configured to provide at least low-level data transfer functionality associated with a particular network interface. Also coupled to the processor 214 is the network interface 220 which provides connectivity to other devices, servers, and so forth.

Figure 3:
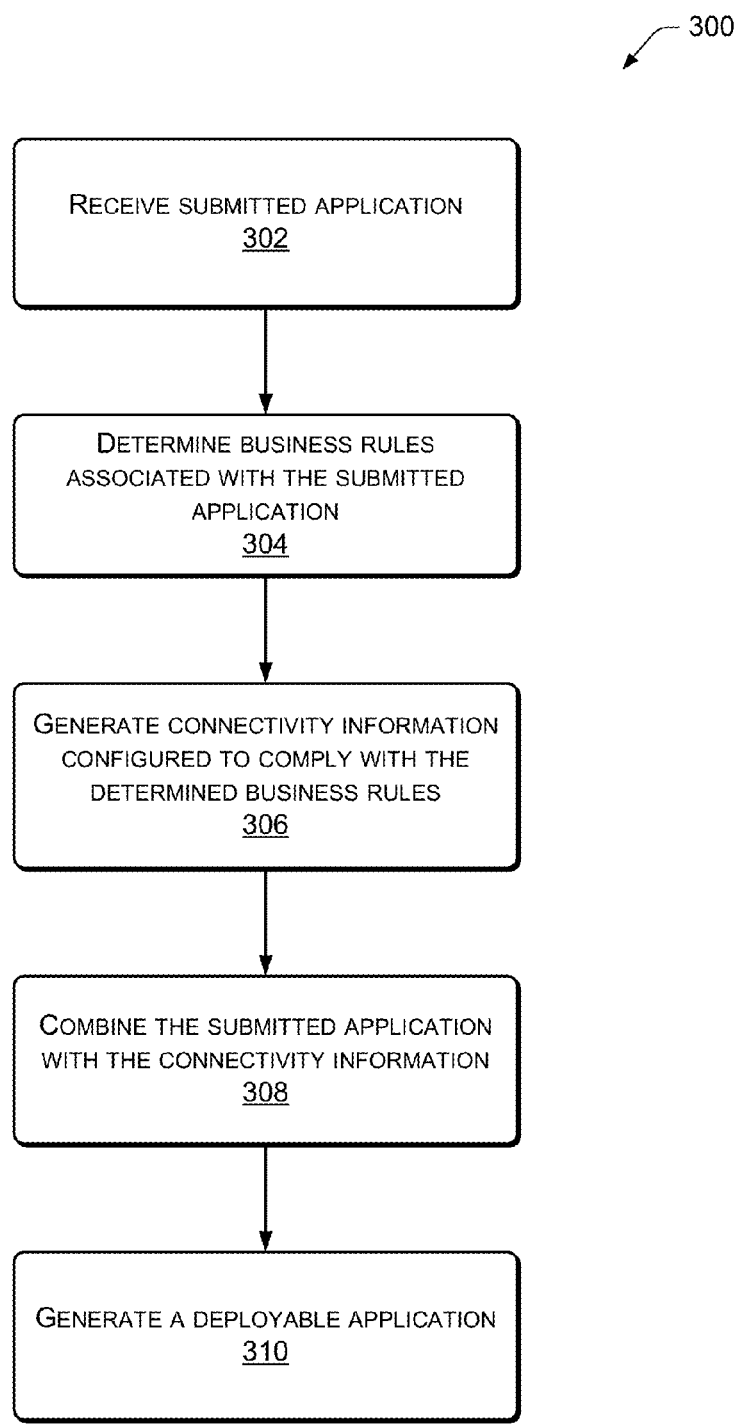
FIG. 3 is a flow diagram of an illustrative process of generating a deployed application that incorporates the connectivity information with integrated business rules.

FIG. 3 is a flow diagram of an illustrative process 300 of generating a deployed application 112 which incorporates the connectivity information 114 having integrated business rules. This disclosure describes several processes which may be implemented by the architectures described herein or by other architectures. These processes are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

In some implementations, the application processing module 206 of the application management server 110 may execute the process 300. At 302, a submitted application 106 is received. For example, the developer 102 may upload the submitted application 106 via the network 108 from the client device 104 or another device to the application management server 110.

At 304, one or more business rules associated with the submitted application are determined. This determination may be automated, manual, or a combination thereof and may comprise analyzing communication requirements and comparing those communication requirements with actions permitted by the business rules. For example, it may be determined that the submitted application 106 is a video chat application requiring bandwidth which is within the capabilities of a WLAN connection but exceeds the capabilities of a WLAN connection. Business rules associated with this video chat submitted application 106 may thus configured to allow only WLAN connectivity.

At 306, the connectivity information 114 is configured to comply with the determined one or more business rules is generated. For example, the connectivity information 114 may provide permissive grants allowing a WLAN connection, but have no permissive grants for (or alternately may include a blocking grant explicitly prohibiting) a WWAN connection, given that the WWAN is prohibited by the business rules.

In some implementations the configuration of the connectivity information 114 may also be determined, at least in part, due to the hardware configuration of a destination client device 104. For example, the submitted application 112 may be permitted under business rules to use a WLAN connection. WLAN connections may include those complying with the IEEE 802.11g and 802.11n standards. However, a particular model of device 104 may only have hardware supporting 802.11g. As a result, the connectivity information 114 configured for that particular model of device 104 may provide for support of 802.11g, but omit 802.11n as unnecessary given the lack of hardware on the client device 104.

At 308, the submitted application 106 is combined with the connectivity information 114. The combination may be tested for quality assurance, including stability, compliance with business rules, and so forth. The connectivity information 114 may be encapsulated within the application 106.

In some implementations, additional operations may be performed on the submitted application 106 to prepare it for deployment. For example, digital rights management (DRM) or other features may be added.

At 310, a deployable application 112 is generated from at least in part the submitted application 106 and the connectivity information 114. This deployed application 112 may contain or be packaged with the connectivity information 114. Once deployed, the deployed application 112 may use one or more of the networks 108 according to available privileges by using the network grants within the connectivity information 114 to access the client-side connectivity module via the connectivity API, as described below in more detail with regards to FIG. 4.

Deployed Application with Connectivity Module

Figure 4:
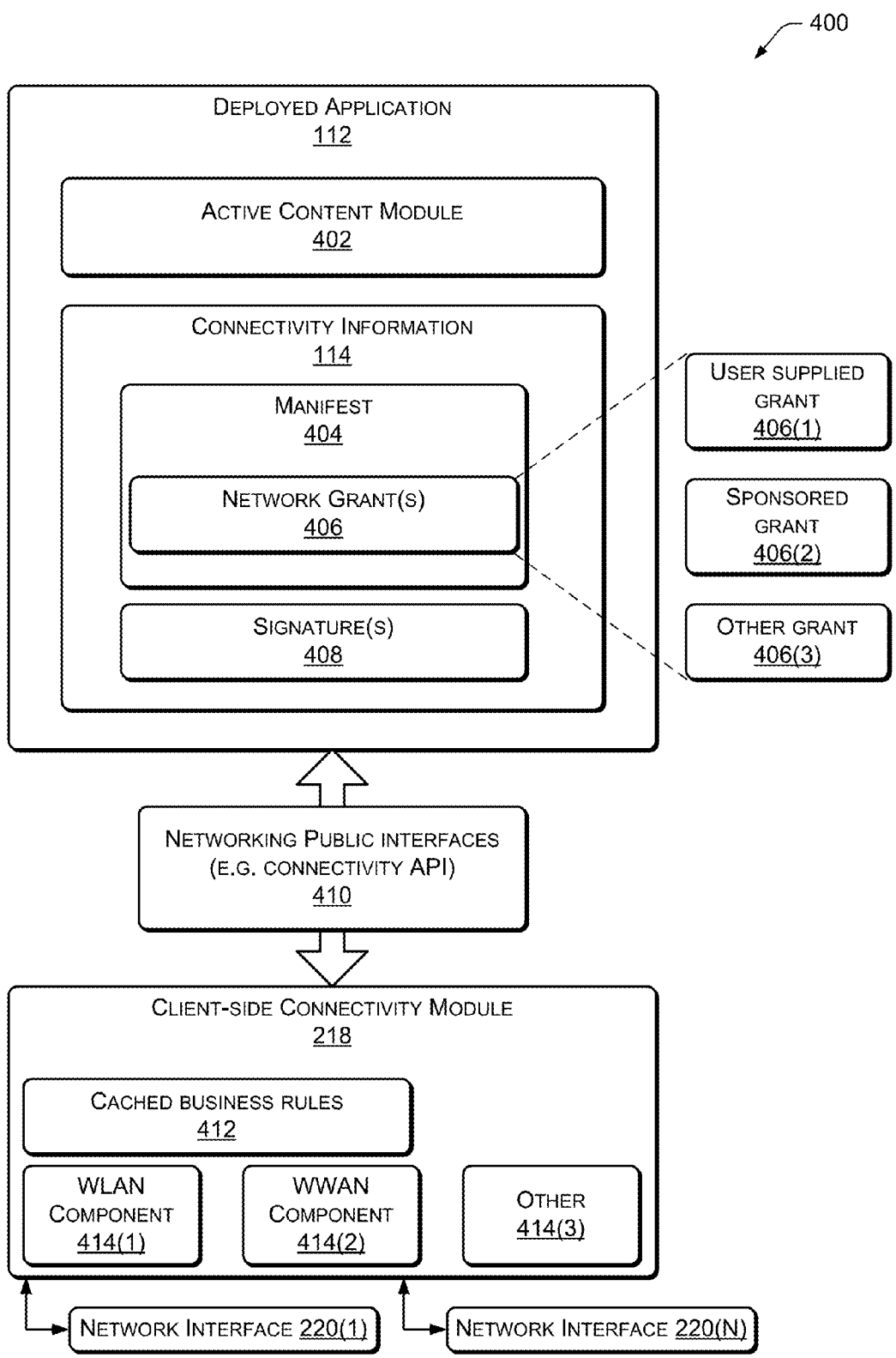
FIG. 4 is a block diagram of an illustrative architecture of a deployed application.

FIG. 4 is a block diagram of an illustrative architecture of a deployed application 400 and associated components. The deployed application 112 is shown with an active content module 402. The active content module 402 comprises the body of the executable program composed by the developer 102. For example, the active content module 402 may be configured to present sports scores on a display of the client device 104. The active content module 402 couples to, or may encapsulate, the connectivity information 114. The connectivity information 114 may contain several of the following components: a manifest 404, one or more network grants 406, and one or more signatures 408. The manifest 404 comprises a listing of components within the connectivity information 114 and one or more of the network grants 406. The network grants 406 set for particular permissions which may be associated with a particular device 104, application, user, geographic location, various network parameters, and so forth. The network grants 406 may be explicitly permissive, such as "allow connectivity to WiFi networks sponsored by XYZ Company" or explicitly blocking such as "prohibit any connectivity to WWAN networks outside of the United States".

Network grants 406 may include grants which are specific to user supplied networks. For example, a user supplied grant 406(1) may allow the application to connect using any network which is supplied by the user. In contrast a sponsored grant 406(2) may allow the application to connect using a network which is supplied by a network sponsor, such as XYZ Company.

Other grants 406(3) may be provided as well. For example, a developer or network testing grant may allow the application to use any network, anywhere.

The network grants 406 define the constraints determined by the business rules within which the active content module 402 may communicate. The active content module 402 may be limited in communication by amount of data, duration of connection, frequency of connections, destination of connection, geographic limitation, user, client device identifier, time of day/date, network sponsor, and so forth. For example, continuing the example of the deployed application 112 providing sports scores on the display, the network grants 406 may limit access to the third-party service provider 122 so long as the client device 104 is within the United States to comply with contractual business rules. In another example, the network grants 406 may define a preference to use WLAN access, but still provide for WWAN access with WLAN access is unavailable.

The connectivity information 114 may also include signatures 408. The signatures 408 may comprise data associated with encryption, authentication, identification, and so forth.

The deployed application 112 utilizes networking public interfaces 410 to establish communication pathways. The networking public interfaces 410 provide a simplified programmatic interface allowing the developer 102 to easily develop applications that are operable in the dynamic environment of the client device, particularly in mobile devices. The networking public interfaces 410 also provide callback mechanisms that enforce business rules while simplifying integration with the active content module 402. Specific networking public interfaces 410 are described below with regards to FIGS. 5-9.

The use of callbacks allows the various network components to complete their tasks such as setup of connection, while the active content module 402 performs another task. The networking component will then call back the active content module 402, indicating the connection is ready.

The networking public interfaces 410 may also be updated or modified, such as via the network 108. These updates may be used to incorporate new features. For example, the networking public interfaces 410 may be updated to reflect the addition of a Bluetooth™ wireless communication interface to the client device 104, and extend the user supplied grant 406(1) to include use of this communication interface. As a result, the mappings between grants 406 and network interfaces may be readily adapted.

The networking public interfaces 410 couple to the client-side connectivity module 218. The client-side connectivity module 218 handles high-level requests from the active content module 402 for communication with remote devices such as the third-party service providers 122, subject to the constraints of the connectivity information 114.

The client-side connectivity module 218 may comprise multiple different components, including cached business rules 412, one or more network component(s) 414, and so forth. The cached business rules 412 provide a mechanism to locally store business rules and associated rule updates 124 on the client device 104. Such local storage may improve response time, minimize network traffic, and so forth.

The network components 414 are associated with a particular physical network interface, and provide the low-level functions which establish a communication pathway suitable for the active content module 402 to use. The network components 414 may include a WLAN component 414(1), a WWAN component 414(2), other components 414(3) such as satellite component, infrared link component, and so forth.

The active content module 402 may thus initiate a communication request. When the connectivity information 114 permits the communication, the networking public interfaces 410 work in conjunction with the client-side networking module 218 and networking components 414 within to establish a communication pathway using the network interface 220. Establishment of the communication pathway may include interactions with the user. The user interaction may be regulated by various factors alone or in combination. These factors may include current device connectivity state, networks supported by the device, application request preferences, the network grants 406 and signature 408, the cached business rules 412 obtained from the proxy servers 120 or the application management servers 110, and so forth. A mapping to an actual physical interface 220 may be based upon the active content module's 402 network access grants 406 even before the user interaction is started. In some implementations, a remote device may initiate the request for communication, and the process operates in the reverse direction.

Figure 5:
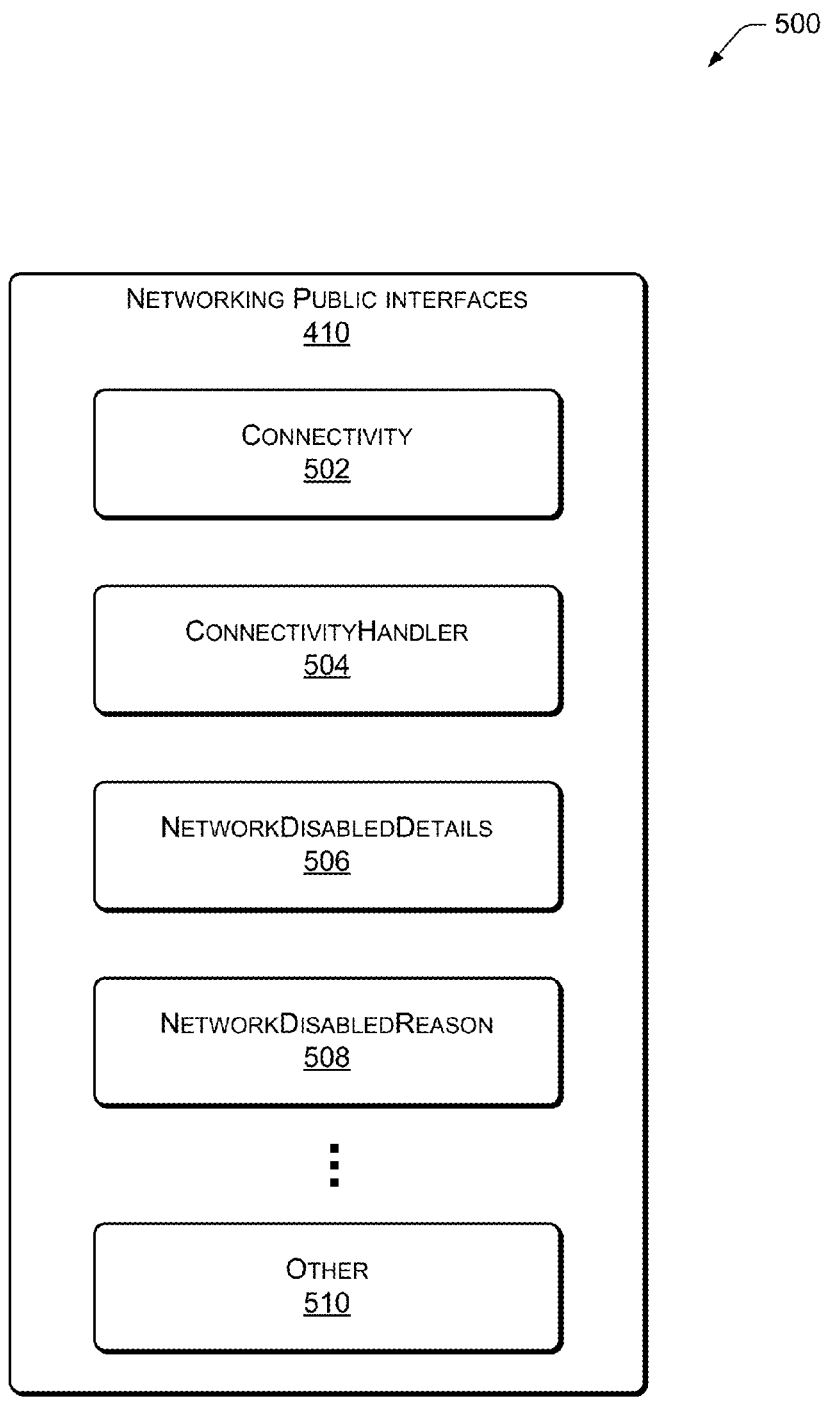
FIG. 5 is a block diagram of an illustrative architecture of networking public interfaces.

FIG. 5 is a block diagram of an illustrative architecture 500 of the networking public interfaces 410. For the sake of illustration, and not by way of limitation, the following networking public interfaces (or "interface" for brevity) are described.

A connectivity 502 interface is configured to provide information about current network connectivity on the client device 104 via a task submission mechanism. In some implementations, applications may be restricted to using hypertext transport protocol (HTTP) and HTTP secured (HTTPS) to connect to remote devices such as the third-party service providers 122. In other implementations other protocols may be used. For various reasons including simplification of development and to improve security, socket connections or other protocols may not be supported within the architecture 100. The developers 102 may use standard URLConnection, HttpURLConnection, and javax.net.ssl.HttpsURLConnection classes. The connectivity 502 interface provides the active content module 402 with knowledge of the availability of the actual network to make such connections. The connectivity interface 502 also aids user interaction in establishing the network pathway that will make the network available. For example, the connectivity 502 interface allows for user interactions and prompting such as "please turn on the wireless networking switch", and so forth.

Many client devices 104, particularly those which are mobile, are battery powered and thus it is desirable to minimize power consumption to improve operating time. To save battery and deal with changing networking conditions, the actual connectivity of the client device 104 may vary. For example, the user 116 may turn off a radio in a network interface, the networking interface within the client device 104 may be powered down without user intervention, the client device 104 may be taken out of range of a wireless access point, and so forth.

A typical pattern for working with the network on the client device 104 is to make a request to use the network and then, when that request is successful, proceed with the network request. If exceptions are thrown during the processing of the request, they may indicate problems with the connection, or they may indicate a change in the state of the connection. One way to handle these exceptions is to inform the user 116. Then, if the user 116 performs another operation that requires network access, a new connectivity request can be made.

Requests for connectivity may execute in a separate set of threads from other events. This permits applications to do work, as needed, directly in the handler without blocking the user interface. However, modifications to the user interface need to be dispatched, such as via EventQueue.invokeLater (Runnable) which causes runnable to have its run method called in the dispatch thread of the EventQueue. This will happen after all pending events are processed. Modification to the user interface may also be dispatched via EventQueue.invokeAndWait(Runnable) which causes runnable to have its run method called in the dispatch thread of the EventQueue. This will happen after each pending event is processed, and the call blocks until this processing completes.

In some implementations, the number of threads used to callback handlers is limited (in some cases it might only be one), so other handlers might not be called back while one is running. The active content module 402 (active content) is recommended to execute high latency operations (such as network I/O or actions waiting on user input) on a separate thread when it is desirable to quickly unblock the thread so that other handlers can be called back.

In one implementation, the interface may implemented as follows:

Code Example 1

```
final ConnectivityHandler handler = new ConnectivityHandler( ) {
    public void connected( ) {
        try {
```

Code Example 1
-continued

```
            // Perform network activity, handling HTTP status
            // codes as expected
        } catch (IOException e) {
            if (tryAgain) {
                connectivity.submitSingleAttemptConnectivityRequest(this);
            } else {
                // Let the user know something went wrong
            }
        }
    }
    public void disabled(NetworkDisabledDetails details) {
        // Let the user know that the network is not working
        // by using details.getLocalizedMessage( )
    }
}
```

Specific methods associated with this interface are described below with respect to FIG. 6.

A connectivity handler 504 interface is configured to receive a notification when the network 108 has become available or is determined to be unavailable. Specific methods associated with this interface are described below with respect to FIG. 7.

A network disabled details interface 506 is configured to provide details about why network access is disabled for the active content module. Specific methods associated with this interface are described below with respect to FIG. 8.

A network disabled reason class 508 is configured to provide information as to why network access is disabled. As used herein, "disabled" is differentiated from "not working" or "unstable." For example, "disabled" may indicate the user has turned off the radio, "not working" may indicate a hardware or software fault preventing proper operation, and "unstable" may indicate the signal strength is too variable to provide a reliable connection.

When the active content module 402 determines that the network 108 is disabled, it is unlikely that the network 108 will become available again during the life of the application. Once disabled, developers 102 in most implementation should only attempt to initiate a new network connection when explicitly requested by the user 116. Specific methods and associated fields are described below with respect to FIG. 9.

Other 510 networking public interfaces may also be provided within the networking public interfaces 410. Such other interfaces may be used to add additional functions at a later date.

Figure 6:
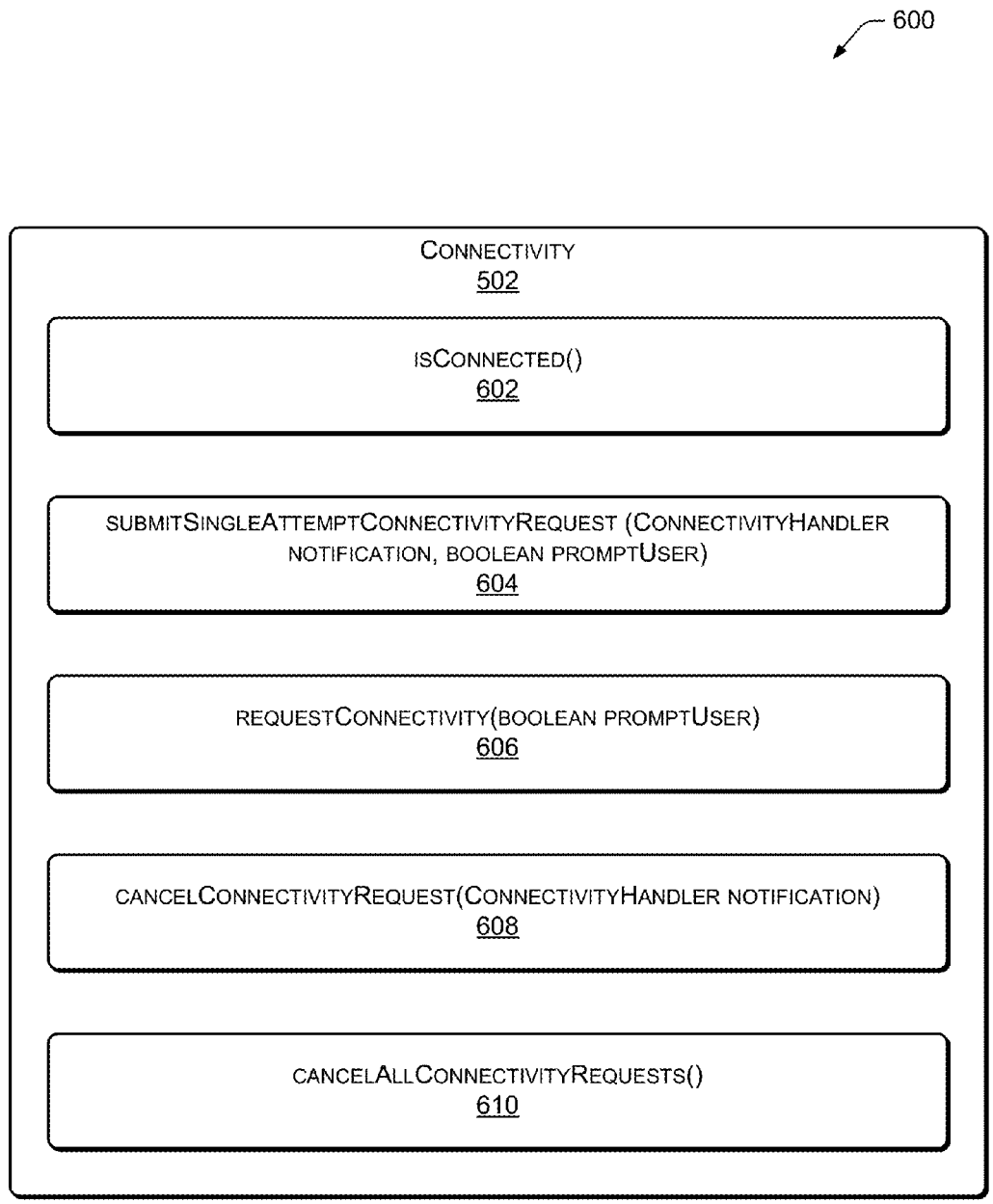
FIG. 6 is a block diagram of an illustrative architecture of a connectivity network public interface.

FIG. 6 is a block diagram of an illustrative architecture 600 of a connectivity network public interface and associated methods. An isConnected 602 method is shown. The method 602 may be expressed as "Boolean isConnected( )". This method returns a Boolean value which hints that the client device 104 is, at the moment of invocation, connected to the network 108. When false, a request for connectivity will likely incur some penalty in terms of latency and power usage such as occurs from powering up a radio frequency module. However, the result from this function does not provide a guarantee of connectivity. The network state may be in flux at any time. Thus, when the method returns a 'true' indicating that the device is connected at this moment, it should be understood that subsequent connectivity requests may experience changes in latency, connectivity drops, and so forth. The developer 102 may establish connectivity by using {@link #submitSingleAttemptConnectivityRequest(ConnectivityHandler) or #requestConnectivity( ). A return of a 'false' value from the isConnected( ) method indicates the client device 104 is not connected at this moment. When the active content module is not authorized to access the network 108, a SecurityException may be thrown.

The connectivity 502 interface may also include a submitSingleAttemptConnectivityRequest 604 method. The method 604 may be expressed as "void submitSingleAttemptConnectivityRequest (ConnectivityHandler notification, boolean promptUser). As described previously, the ability to prompt the user for specific actions aids in the establishment of a network pathway. For example, the user may be prompted to turn on a physical switch providing power to the networking interface. This method submits a request to connect to an available network 108 in an asynchronous manner. If the device fails to establish a network connection, the handler's ConnectivityHandler.disabled (NetworkDisabledDetails) application programming interface ("API") will be called. This allows the active content module 402 to give timely feedback to the user 116 in the cases where the network 108 is currently unavailable.

This request may be silently cancelled when the deployed application 112 is stopped. It is advised that active content modules 402 cancel any outstanding network connectivity requests when stopped (for example, using the cancelAllConnectivityRequests( ) method) and submit new requests when started again, if needed.

Registering for a notification implies that the active content module 402 is interested in making a network connection and may cause the user 116 to be prompted if network connectivity has been deactivated by the user 116 or some user configuration needs to be done before use. This is controlled by the promptUser argument. Note that even after receiving the callback, an error may still occur resulting in the network 108 disconnecting before an actual connection can be made.

Although it is possible to register several handlers for notification, each handler will only be called once in most implementations. A handler can re-register itself during the notification callback.

Parameters for the method 604 include notification and promptUser. The notification parameter sets the handler to be notified when the network 108 is available. Nulls are ignored, as are duplicates. The promptUser parameter sets a flag indicating whether the user 116 can be prompted if needed (to enable or configure the network connection).

This method may throw at least two exceptions, an IllegalStateException and a SecurityException. The IllegalStateException occurs when a request is received before the active content module 402 has been started or after it has been stopped. The SecurityException occurs when the active content module 402 is not authorized to access the network 108.

A requestConnectivity 606 method is also provided. The method 606 may be expressed as "void requestConnectivity (boolean promptUser)". The requestConnectivity 606 method synchronously requests connectivity. If the call completes, it means that the request succeeded and the active content module 402 can proceed to use the network 108. If the connectivity request fails for any reason, then a @link NetworkDisabledException will be thrown and can be used to obtain further details on the error (such as a recommended error message to display to the user). This allows the active content to give timely feedback to the end user in the cases where the network 108 is currently unavailable.

This request is carried out synchronously and may take a (relatively) long time to complete. As a result of this relatively long time to complete, invocation from the Event Dispatch Thread is not recommended in some instances. Requesting connectivity implies that the active control module 402 is interested in making a network connection, such as to the third-party service provider 122, and may cause the user 116 to be prompted if the network connection on the device 104 has been deactivated by the user 116 or any configuration needs to be done. This may be controlled by the promptUser argument. Note that even after successful completion of this method, an error might still occur resulting in the network disconnecting before an actual connection can be made.

The method 606 provides for a promptUser parameter. The promptUser parameter comprises a flag indicating whether the user 116 can be prompted if needed (to enable or configure the network connection on the client device 108).

The method 606 may throw several exceptions. A NetworkDisabledException occurs when an attempt to access to the network 108 has failed. If the network access attempt was a result of a user initiated action or the user is waiting on the results of the network connection in any way, it is advised that the application uses NetworkDisabledException.getNetworkDisabledDetails( ) to get the network disabled details and then invoke NetworkDisabledDetails.getLocalizedMessage( ) to get an appropriate error message to display to the user 116 in some instances.

An IllegalStateException occurs if a request is received before the active content module has been started or after it has been stopped. This exception will also be thrown if invoked from the Event Dispatch Thread.

A CancelledConnectivityRequestException occurs in the event that the active content module 402 has been stopped. As above, a SecurityException is thrown when this active content module 402 is not authorized to access the network 108. An InterruptedException is thrown when this thread is interrupted.

A cancelConnectivityRequest 608 method is also provided. The method 608 may be expressed as "void cancelConnectivityRequest(ConnectivityHandler notification)". This method 608 cancels a specific connectivity request submitted to either the submitConnectivityRequest(ConnectivityHandler) or #submitSingleAttemptConnectivityRequest (ConnectivityHandler) APIs. The method 608 uses a notification parameter indicating the callback to cancel. It is still possible for this callback to be called until this function returns. Nulls or missing callbacks are ignored. A SecurityException is thrown if the active content module 402 is not authorized to access the network 108.

A cancelAllConnectivityRequests 610 method provides a public interface for cancelling pending connectivity requests. The method 610 may be expressed as "void cancelAllConnectivityRequests( )". In some implementations, this method 610 may be configured to cancel all pending connectivity requests submitted to either the submitConnectivityRequest (ConnectivityHandler) or #submitSingleAttemptConnectivityRequest(ConnectivityHandler) APIs. This method 610 may also throw a SecurityException if this active content module 402 is not authorized to access the network 108.

Figure 7:
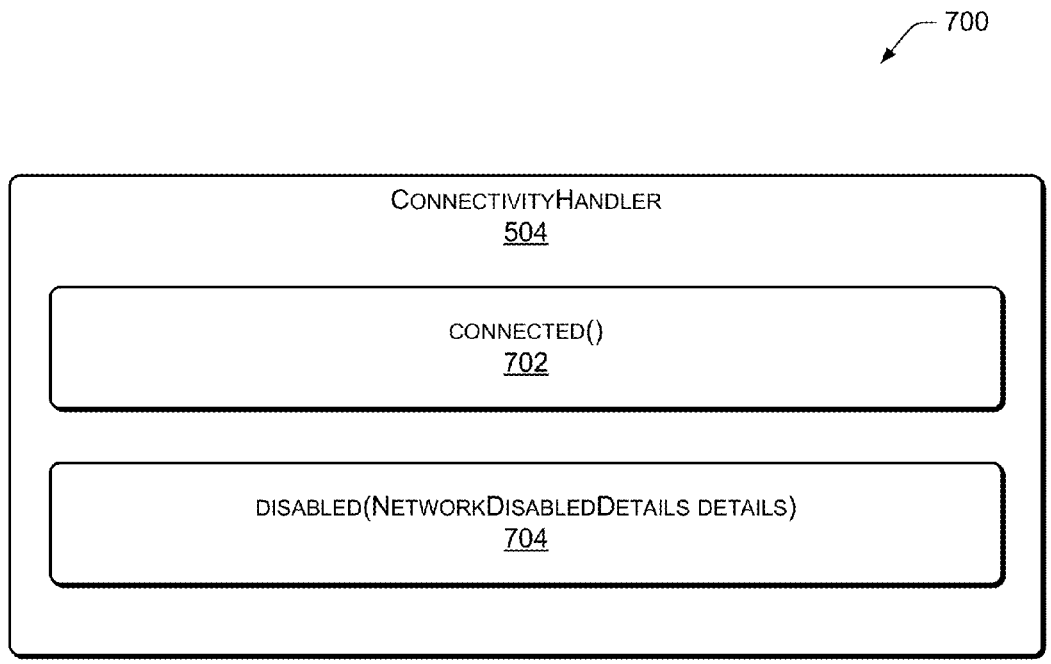
FIG. 7 is a block diagram of an illustrative architecture of a connectivity handler network public interface.

FIG. 7 is a block diagram of an illustrative architecture of a connectivity handler 504 network public interface. This interface receives notification when the network 108 has become unavailable or is determined to be unavailable.

The connectivity handler 504 may include a connected 702 method. This method 702 may be expressed as "void connected( )". This method is called once (per submission) when the network 108 is available. Note that it is possible that the network 108 becomes unavailable again before this method is actually executed. This will commonly show up as an IOException during the network connection process. Applications should respond to such errors by issuing a new connectivity request. Connectivity callbacks execute in a separate set of threads than other events. This permits applications to do work, as needed, directly in the handler without blocking the user interface. However, it does mean that any modifications to the user interface need to be dispatched via EventQueue-.invokeLater(Runnable) or EventQueue.invokeAndWait (Runnable). Also, in some implementations the number of threads used to callback handlers is limited (in some cases it might only be one), so other handlers might not be called back while one is running. It is therefore advised that applications executing high latency operations (such as network I/O or actions waiting on user input) on a separate thread if the thread is to be quickly unblocked so that other handlers can be called back.

The connected 702 method may throw an InterruptedException. Implementers of this interface should not "absorb" InterruptedExceptions thrown from within this method 702. Doing so may cause an application to exit abnormally under some circumstances. If the active content module 402 needs to handle these exceptions in some manner, the current thread should be re-marked as Interrupted. One implementation of re-marking is shown below.

Code Example 2

```
public void connected( ) throws InterruptedException {
    try {
        myInterruptableMethod( );
    } catch (InterruptedException e) {
        // do something with this exception here
        // then re-mark the current Thread as being
        // interrupted...
        Thread.currentThread( ).interrupt( );
    }
}
```

The ConnectivityHandler 504 interface may include a disabled 704 method. The disabled 704 method may be expressed as "void disabled(NetworkDisabledDetails details)". This method 704 may be called when network access is disabled. This can occur in response to situations including but not limited to: a network switch was off on the client device 104, the client device 104 is in a roaming service area and not authorized to access the network, the client device 104 is not registered, and so forth. This is described in more detail below with regards to FIG. 9.

If the network access attempt was caused by a user initiated action or the user 116 is waiting on the results of the network connection in any way, it is advised that the application uses NetworkDisabledDetails.getLocalizedMessage( ) to get an appropriate error message to display to the user 116 in some instances. This may also be done when the connectivity request's promptUser flag passed was true.

The disabled 704 method may throw an InterruptedException. As above, implementers of this interface should not "absorb" InterruptedExceptions thrown from within this method 702. Doing so may cause an application to exit abnormally under some circumstances. If the active content module 402 needs to handle these exceptions in some manner, the current thread should be re-marked as Interrupted, such as shown in Code Example 2 above. This method 704 may have a parameter of details, which provides details on why network access is disabled.

Figure 8:
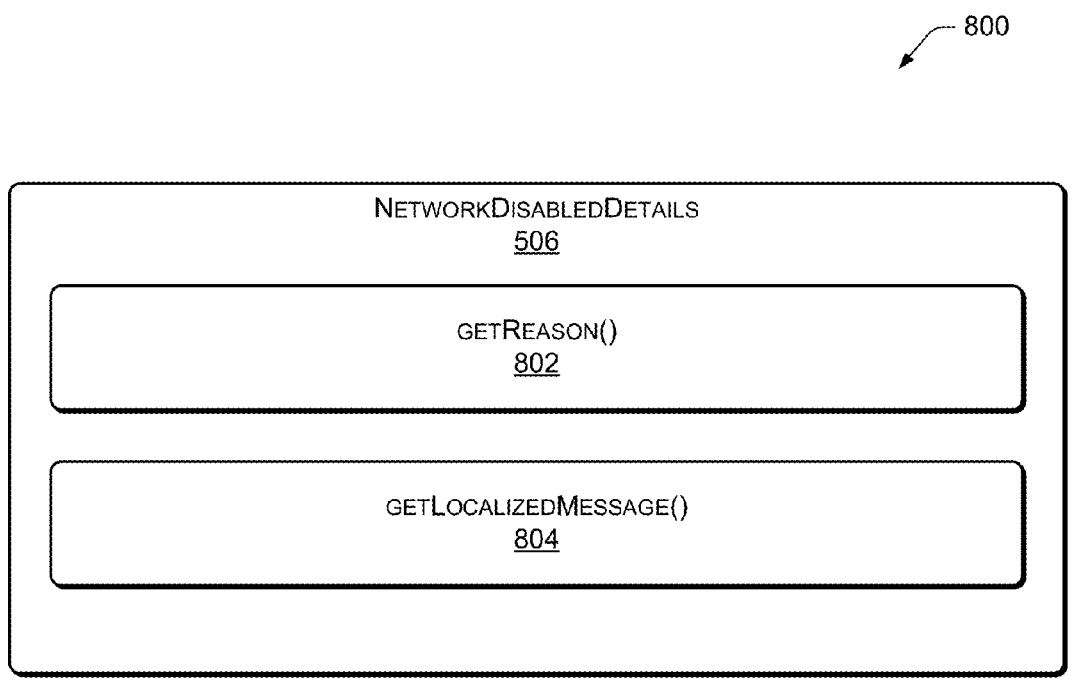
FIG. 8 is a block diagram of an illustrative architecture of a network disabled details network public interface.

FIG. 8 is a block diagram of an illustrative architecture 800 of a network disabled details 506 network public interface. This interface provides details about why network access is disabled for the application and may include two methods, a getReason 802 and a getLocalizedMessage 804.

The getReason 802 method may be expressed as "NetworkDisabledReason getReason( )". This method 802 returns a value indicating why access to the network 108 is disabled. These details are described in more detail below with regards to FIG. 9.

The getLocalizedMessage 804 method may be expressed as "String getLocalizedMessage( )" and provides a human readable description of the network disabled reason and details that can be used to inform the user of the situation. While localized messages may not be present in some circumstances, developers 102 are encouraged to use this method to ensure that such localization is used when available. The method 804 returns a human readable description of the reason the network connectivity is disabled, intended to inform the user 116 of the situation.

Figure 9:
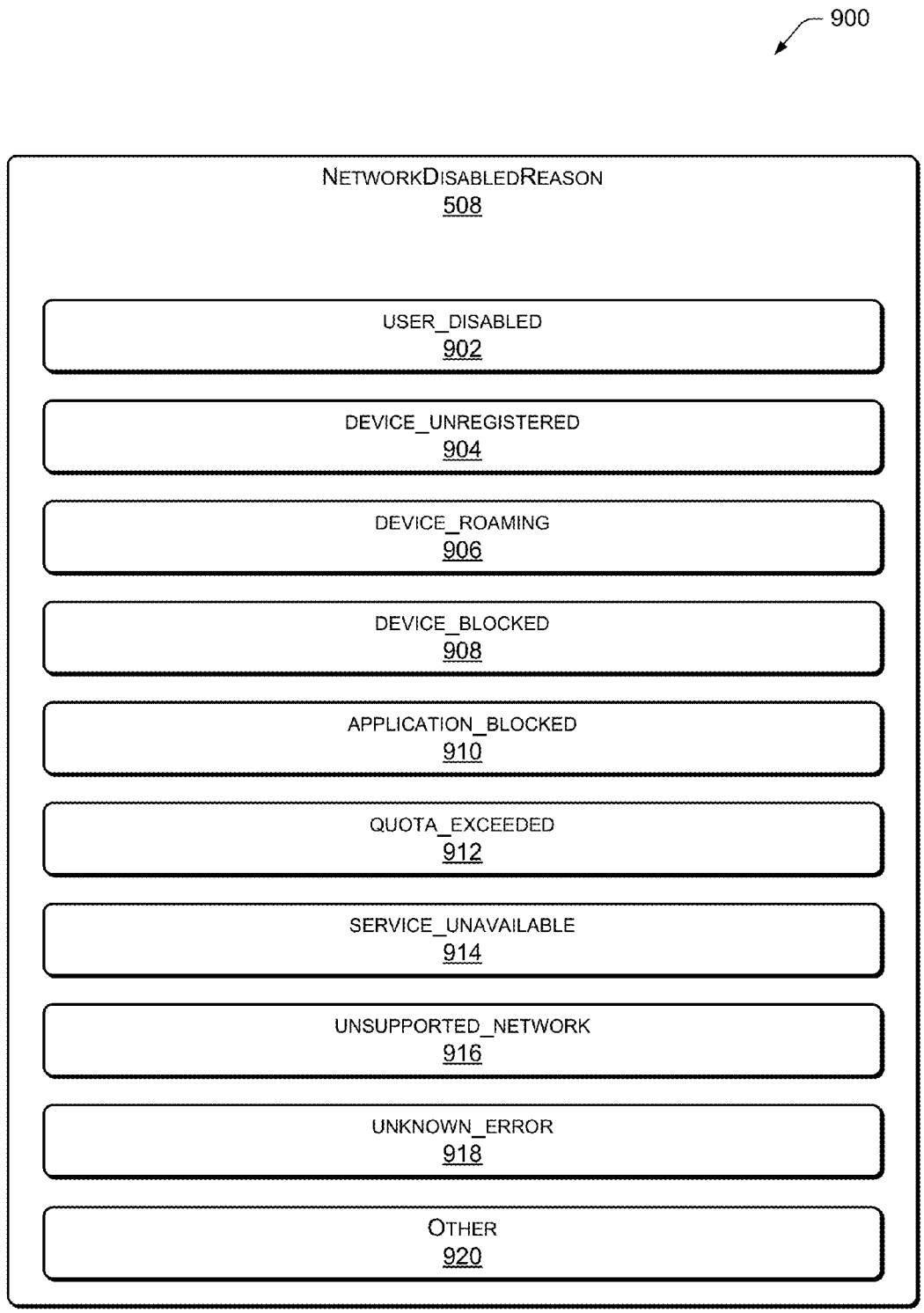
FIG. 9 is a block diagram of an illustrative architecture of a network disabled reason network public interface.

FIG. 9 is a block diagram of an illustrative architecture 900 of a network disabled reason 508 class. This class may take the form of "public class NetworkDisabledReason" and provides details as to why access to the network 108 is disabled. As described above, "disabled" is a separate concept from "not working" or "unstable". When an active content module 402 determines that the network 108 is disabled, it is unlikely that the network 108 will become available again during the life of the active content module 402 execution. It is recommended in some instances that, once disabled, developers 102 configure the active content module 402 to attempt to initiate a new network connection only when explicitly asked by the user 116.

This class may be implemented as a type-safe set of constants. New reasons may be introduced in the future, so active content modules 402 should handle the case where none of these reasons match. The following fields may be included in this class.

A user_disabled 902 field may have the form "public static final NetworkDisabledReason USER_DISABLED" and indicates the network 108 is disabled at the user's 116 request. For example, the user 116 may have manually disabled wireless networking.

A device_unregistered 904 field may have the form "public static final NetworkDisabledReason DEVICE_UNREGISTERED". This field indicates the client device 104 is not registered with the proxy server 120, application management server 110, third-party service 122, or a combination thereof.

A device_roaming 906 field may have the form "public static final NetworkDisabledReason DEVICE_ROAMING". This field indicates the device is currently roaming outside of a pre-determined coverage area and network connectivity is not available for this application in this location.

A device_block 908 field may have the form "public static final NetworkDisabledReason DEVICE_BLOCKED". This indicates the client device 104 has currently been blocked from accessing the network 108. For example, the particular client device 104 may have recorded as lost or stolen, and may be blocked.

An application_blocked 910 field may have the form "public static final NetworkDisabledReason APPLICATION_BLOCKED". This field 910 indicates the current active content module has been blocked from accessing the network 108. For example, the application may have been withdrawn or superseded, and further access is prohibited.

A quota_exceeded 912 field may have the form "public static final NetworkDisabledReason QUOTA_EXCEEDED." This field indicates that the active content module, on this particular client device 104, has exceeded its network usage quota. In some implementations this data transfer quota may be for a pre-determined period such a day, month, week, quarter, and so forth. In other implementations, the quota may be set for the life of the application, device 104, user 116, and so forth.

A service_unavailable 914 field may have the form public static final NetworkDisabledReason SERVICE_UNAVAILABLE". This indicates the network to which a connection is desired is inaccessible. For example, this field may be presented during a temporary service interruption resulting from a failure at a radio tower of the service provider.

An unsupported_network 916 field may have the form "public static final NetworkDisabledReason UNSUPPORTED_NETWORK". This field provides feedback that the active content module requires a network type not supported on this device. For example, the application may seek to use a Bluetooth wireless module to connect to another client device 104 which is physically close by, but the client device 104 lacks the Bluetooth wireless module.

An unknown_error 918 having the form "public static final NetworkDisabledReason UNKNOWN_ERROR" indicates an unknown network error has occurred and has resulted in the network connectivity on the client device 104 being disabled.

Other 920 network disable reasons may also be incorporated to account for different operational situations. For example, a network disable reason may indicate that the particular combination of device and user currently logged into the device is blocked.

Figure 10:
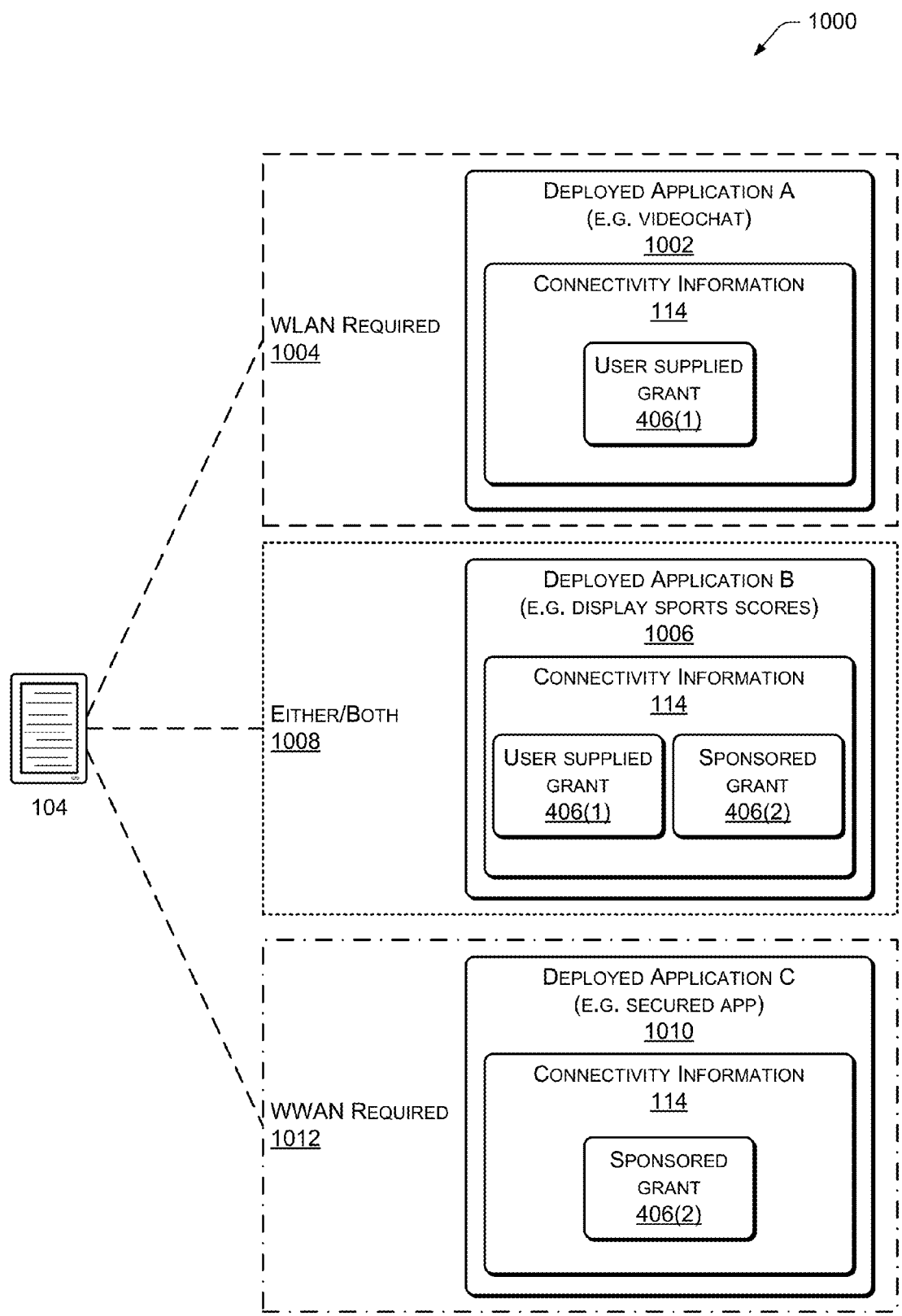
FIG. 10 is a block diagram of an illustrative architecture of a single client device with multiple deployed applications, each with different connectivity information.

FIG. 10 is a block diagram of an illustrative architecture 1000 of a single client device with multiple deployed applications, each with different connectivity information. In this illustration, the client device 104 is shown with three deployed applications installed thereon. A deployed application "A" 1002 is bandwidth intensive application, such as a video chat. As a result, at ingestion the business rules designated that this application requires a WLAN for operation 1004, and is also restricted to WLAN-only operation. As a result of these restrictions, the connectivity information 114 of the deployed application "A" 1002 contains the user supplied grant 406(1) allowing connectivity with connections supplied by the user, such as WLAN. Because WWAN functionality is not permitted at ingestion, no corresponding network grant is included in the connectivity information 114 of the deployed application 1002.

Also installed on the client device 104 is deployed application "B" 1006. This deployed application may be configured to present the user with current scores from sporting events. Because the lower bandwidth of WWAN connectivity will support this application, and because the business rules at ingestion permit, the connectivity information 114 contains both the user supplied grant 406(1) and the sponsored grant 406(2) as shown at 1008. As a result, the deployed application "B" 1006 may use either network 108. The deployed application 112, the client side connectivity module 218, or a combination of the two may be configured to preferentially use one network 108 over another, for example connecting to a WLAN when available, and the WWAN only when the WLAN is unavailable.

In another implementation different functions may be presented to the depending upon availability of a particular network. For example, the deployed application "B" 1006 may allow a multiplayer game mode with others via the WLAN, but not via the WWAN which is dedicated (per the business rules and associated connectivity information 114) for transfer of lower bandwidth sports scores only.

Deployed application "C" 1010 is shown for an application which is configured such that WWAN connectivity is required 1012. For example, the application may handle secured information for which it is undesirable to pass traffic on networks such as a public WLAN connection. As a result, the connectivity information 114 of the deployed application "C" 1010 contains only the sponsored grant 406(2) allowing access to the WWAN for connectivity. Even where a WLAN is available to the client device 104, the deployed application "C" 1010 does not have the user supplied grant 406(1) permitting use of the WLAN.

Processes of Determining Connectivity

Figure 11:
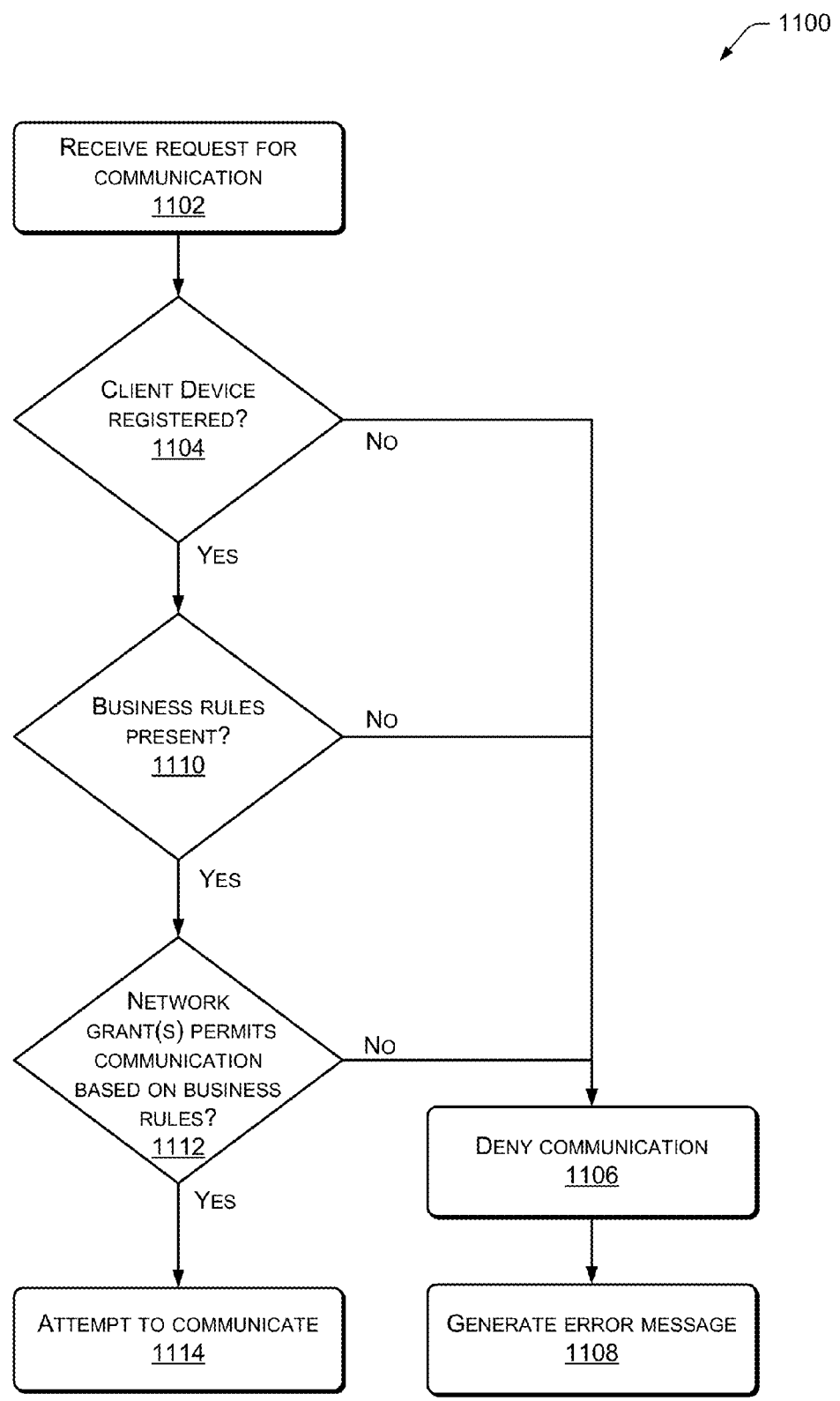
FIG. 11 is a flow diagram of an illustrative process of determining when communication is permitted on the client device.

FIG. 11 is a flow diagram of an illustrative process 1100 of determining when communication is permitted on the client device 104. In some implementations, the following operations may be performed by the client-side connectivity module 218.

At 1102, a request for communication via the network 108 from an the active content module 402 within the deployed application 112 which is executing on the client device 104 via a network 108 is received. At 1104, a determination is made as to whether the client device 104 is registered. The client device may be registered with the proxy server 120, the application management server 120, the third-party service provider 122, or another server or entity. When registered, the client device 104 may store information about registration, such as a registration status flag, registration code, and so forth. This information about registration may then be retrieved from the client device 104 and used for determination 1104. Likewise, the proxy server 120 or other server may store identification and other information about the client device 104.

When at 1104 the client device 104 is unregistered the process proceeds to 1106 where communication is denied. After denying communication, at 1108 an error message may be generated. In some implementations this error message may be presented to the user 116.

When at 1104 the client device 104 is registered, the process proceeds to determine at 1110 when one or more business rules associated with the client device 104 are present. As described above, the business rules may be distributed to the client device 104 with the deployed application 112 upon deployment, via rule updates 124 subsequent to deployment, or a combination thereof.

When at 1110 no business rules are is present, the process proceeds to 1106 and denies communication. When at 1110 the business rule is present, the process proceeds to determine when communication is permitted by the available network grant 406 at 1112. In another implementation, the logic may be inverted, such that when no business rules are present, communication is permitted.

When at 1112 the network grants 406 do not permit communication based on the business rules, the process proceeds to deny communication at 1106. When at 1112 the network grants 406 in conjunction with the business rules allow the communication, the process proceeds to 1114 and attempts to communicate. The process of attempting to communicate is described next with regards to FIG. 12.

Figure 12:
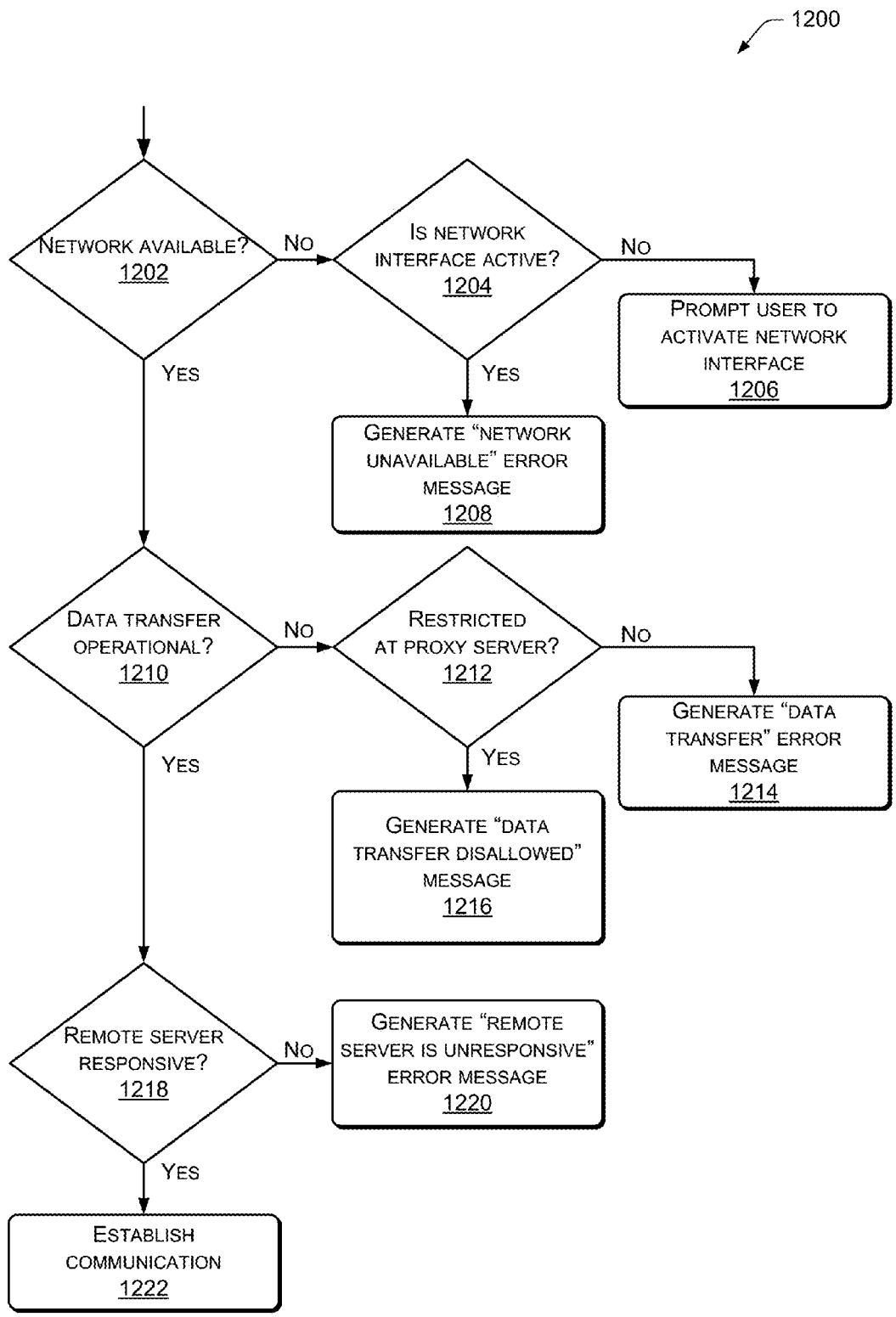
FIG. 12 is a flow diagram of an illustrative process of attempting to connect when communication is permitted on the client device.

FIG. 12 is a flow diagram of an illustrative process 1200 of attempting to connect when communication is permitted on the client device 104. At 1202, an attempt to communicate is received. At 1204 a determination is made as to when the network 108 requested by the active content module 402 available. When at 1204 the network 108 is determined to be unavailable, at 1204 a determination is made as to when a network interface is active.

At 1206, when the network interface is inactive, the process proceeds to 1208 and prompts the user 116 to activate the network interface. When at 1206 the network interface is determined to be active, at 1210 a network unavailable error message is generated which indicates the network is unavailable. As described above, this may also provide the opportunity for additional user interaction. This user interaction may be regulated by various factors alone or in combination. These factors may include current device connectivity state, networks supported by the device, application request preferences, the network grants 406 and signature 408, the cached business rules 412 obtained from the proxy servers 120 or the application management servers 110, and so forth.

When at 1204 the network 108 is available, the process proceeds to determine at 1212 when data transfer is operational. When at 1212 the data transfer is inoperable, the process proceeds to 1214 to determine when the data transfer is restricted at the proxy server 120. When at 1214 the data transfer is unrestricted at the proxy server, at 1216 a data transfer error message is generated which indicates a problem with data transfer. When at 1214 the data transfer is restricted at the proxy server 120, at 1218 a data transfer disallowed error message is generated which indicates the data transfer is not permitted, which may result from one or more of the business rules.

Returning to 1212, when the data transfer is operable, the process proceeds to 1220 to determine when a remote server is responsive. When the remote server is unresponsive, at 1222 a remote server is unresponsive error message is generated which indicates the remote server is not responding. When at 1220 the remote server is responsive, at 1224 communication with the remote server is established.

User Interface

Figure 13:
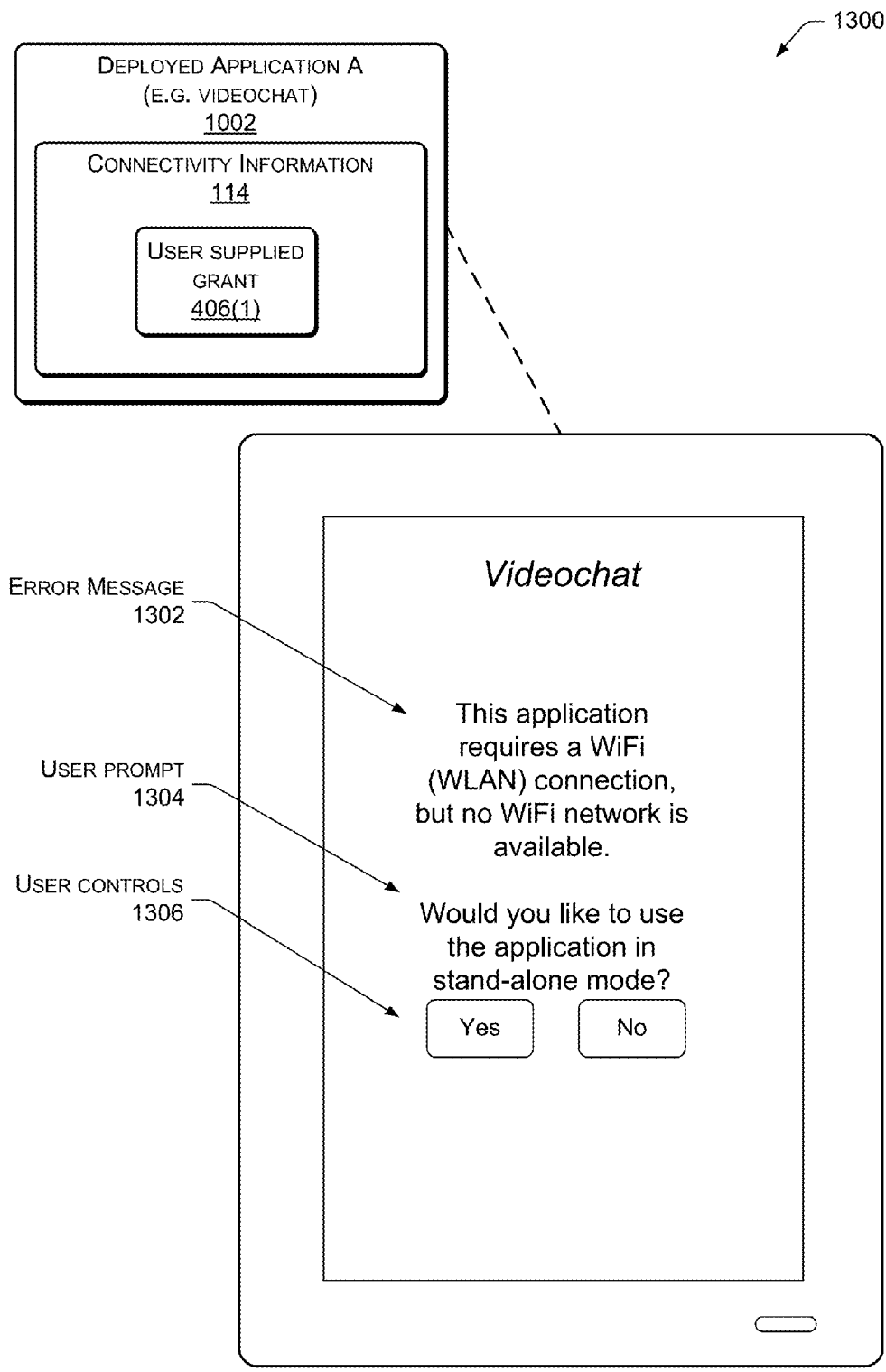
FIG. 13 is an illustrative user interface of a deployed application prompting a user when no network connection is available.

FIG. 13 is an illustrative user interface 1300 of a deployed application. In this illustration, the user is prompted when the client-side connectivity module 218 in conjunction with the connectivity information 114 has determined no network connection is available. For example, the user 116 may be attempting to use the deployed application "A" 1002 for a video chat, but no user supplied network grant 406(1) for the WLAN network 108 is available. Because no network grant for the WLAN is available, the client side connectivity module 218 has thrown an exception, which in turn has generated an error message 1302 presented here.

The error message 1302 presented indicates no WLAN network 108 is available, which is required by the connectivity information 114 and the one or more business rules. A user prompt 1304 is presented asking the user if they wish to use the application in a standalone mode, such as to replay a previously stored video chat. User controls 1306 may be selected by the user in response to the prompt 1304.

In some implementations the user may be supplied with specific prompts or options based upon the current state of the device, network, application preferences, network grants 406, and so forth. For example, where the WLAN is unavailable because the network interface switch is "OFF", the user may be prompted to turn the network interface switch on.

Proxy Server Architecture

Figure 14:
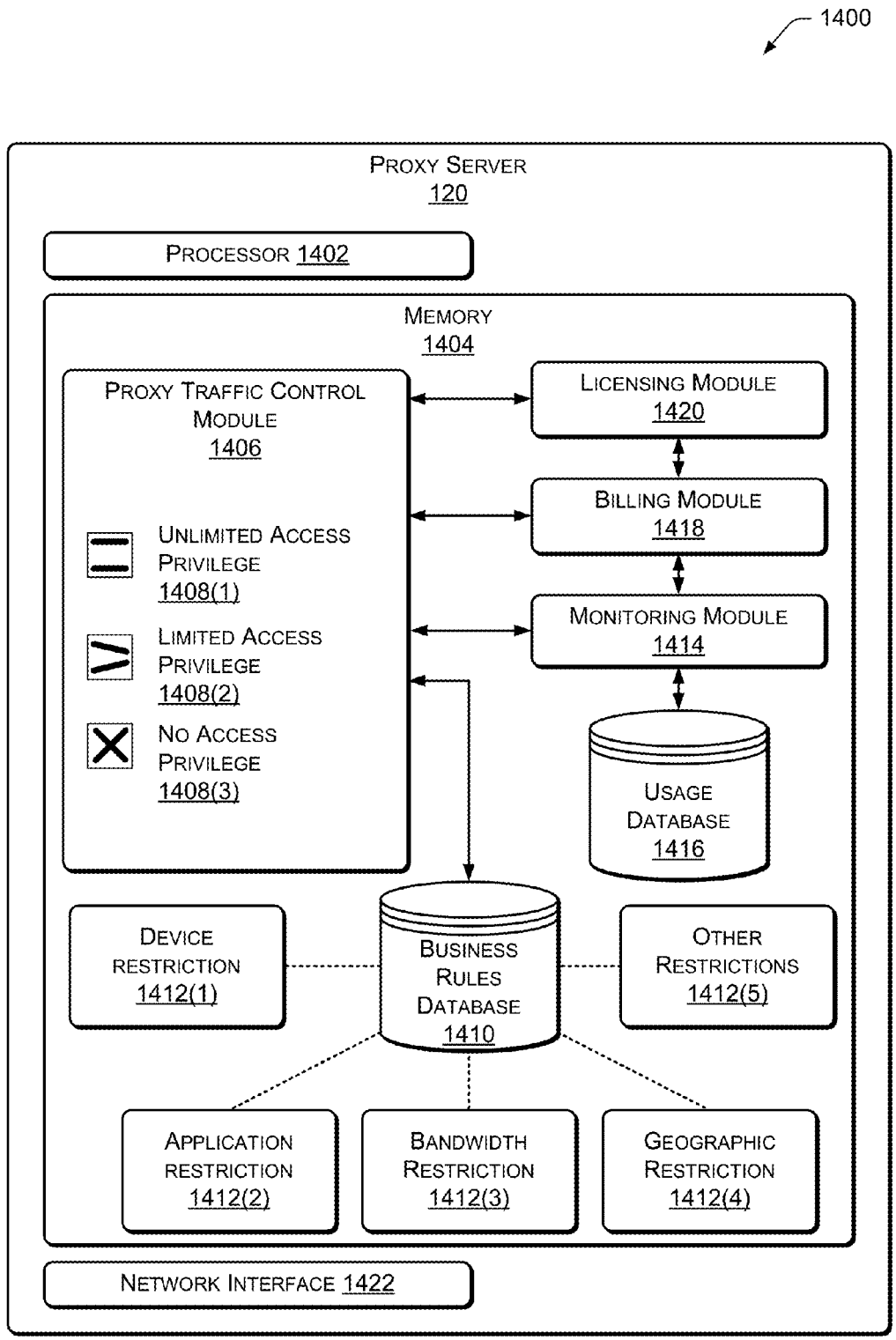
FIG. 14 is a block diagram of an illustrative architecture of a proxy server configured to control traffic from the client device according to business rules.

FIG. 14 is a block diagram of an illustrative architecture 1400 of a proxy server 120 configured to manage traffic from the client device 104 according to one or more business rules. As depicted here, the proxy server 120 comprises a processor 1402 coupled to a memory 1404. The memory 1404 may include computer-readable storage media ("CRSM") as described above. In some implementations the functions of the proxy server 120 may be distributed across a plurality of devices, such as in a cloud computing environment. For example, the proxy server 120 may comprise a plurality of individual servers configured to perform the functions of the modules described herein.

Within the memory a proxy traffic control module 1406 is stored and may be executed on a processor, such as the processor 1402. The proxy traffic control module 1406 is configured to provide various levels of connectivity between the client device 104 and third-party service providers 122, corresponding to restrictions or privileges imposed by the one or more business rules. Unlimited access privileges 1408(1) impose no restrictions on the deployed application 112. Limited access privileges 1408(2) allow some communication, subject to various privileges and restrictions as set out by the one or more business rules. No access privileges 1408(3) prevent all communication via the proxy server 120 to third-party service providers 122, also in accord with the one or more business rules. In some implementations, no access privileges 1408(3) may result in the proxy server 120 not responding to communication attempts from the client device 104 which are restricted by the one or more business rules.

Stored within the memory 1404 and interacting with the proxy traffic control module 1406 is a business rules database 1410. In other implementations the business rules database 1410 may be, at least partially, stored on memory within another device, synchronized with the business rules database 210, and so forth. The business rules database 1410 stores the various restrictions and privileges which relate to the architecture described herein. Device restrictions 1412(1) may be stored, which place limitations on data transfer for a particular client device 104. Application restrictions 1412(2) may be stored which limit data transfer for a particular application. Bandwidth restrictions 1412(3) limit the amount of data transferred in a given period. Geographic restrictions 1412(4) limit data transfer at least partly in response to the geographic location (or "geolocation") of the device, user, third-party server 122, and so forth.

Other restrictions 1412(5) may also be stored within the business rules database 1410. For example, business rules may limit communication by time of day, such that communication is only permitted during school hours.

In some implementations, various restrictions and privileges may be combined. For example, the deployed application 112 may be restricted on a particular client device 104 from transferring data while outside of a pre-determined geographic region.

A monitoring module 1414 is also shown, coupled to the proxy traffic control module 1406. The monitoring module 1414 collects usage information about the client devices 104 and their associated usage of the proxy server 120. For example, the monitoring module 1414 may collect information about bandwidth used, duration of connection, latency, application used, device identifier, and so forth. The monitoring module 1414 may store this data in a usage database 1416.

A billing module 1418 may couple to the monitoring module 1414 and use, at least in part, the usage information for billing purposes. For example, the billing module 1418 may be configured to assess differing fees for the usage of the deployed application 112 based at least in part upon the geographic location of the device 104.

A licensing module 1420 may also be present in the proxy server 120. The licensing module 1420 is configured to maintain the licensing rights of participants in the environment. For example, the licensing module 1420 may analyze application identifiers and traffic to determine whether a particular deployed application 112 is out of compliance with the licensing rights of that application.

Within the proxy server 120 is a network interface 1422, also coupled to the processor 1402. This network interface 1420 allows the proxy server 120 to couple to other servers or devices and establish communication.

Figure 15:
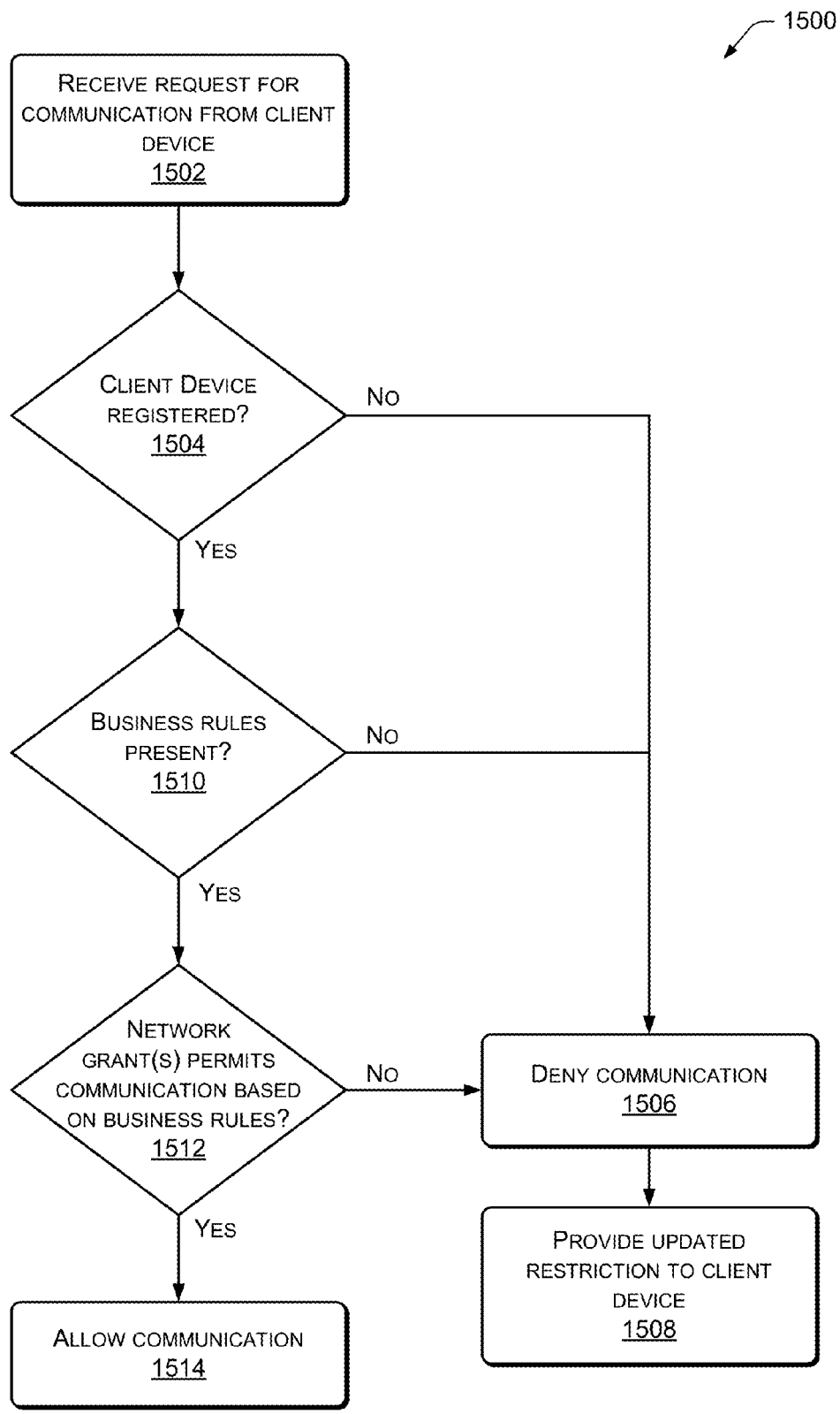
FIG. 15 is a flow diagram of an illustrative process of determining when the client device is permitted to communicate.

FIG. 15 is a flow diagram of an illustrative process 1500 of determining when the client device 104 is permitted to communicate via the proxy server 120. In some implementations, the following operations may be performed by the proxy traffic control module 1406.

At 1502, a request for communication is received at the proxy server 120 from the client device 104. At 1504, a determination is made as to whether the client device 104 is registered with the proxy server 120.

When at 1504 the client device 104 is unregistered, the process proceeds to 1506 where communication is denied. After denying communication, at 1508 updated restriction information or other business rules are provided to the client device 104.

When at 1504 the client device 104 is registered with the proxy server 120, the process proceeds to determine at 1510 when one or more business rules associated with the client device are present. This determination may comprise interrogating the business rules database 1410. The one or more business rules may have been distributed from a remote device such as the application management server 110, third-party service provider 122, and so forth. In another implementation, the logic of this determination may be inverted, such that when no business rules are present, communication is permitted.

When at 1510 no business rules are present, the process proceeds to 1506 and denies communication. When at 1510 business rules are present, the process proceeds to determine when the available network grant permit communication based on the business rules at 1512.

When at 1512 the available network grant 406 do not communication based on business rules, the process proceeds to deny communication at 1506. When at 1512 the network grant 406 in conjunction with the business rules allows the communication, the process proceeds to 1514 and allows communication.

Conclusion

Although specific details of illustrative methods are described with regard to the figures and other flow diagrams presented herein, it should be understood that certain acts shown in the figures need not be performed in the order described, and may be modified, and/or may be omitted entirely, depending on the circumstances. As described in this application, modules and engines may be implemented using software, hardware, firmware, or a combination of these. Moreover, the acts and methods described may be implemented by a computer, processor or other computing device based on instructions stored on one or more computer-readable storage media.

What is claimed is:

1. One or more non-transitory computer-readable storage media storing instructions that, when executed on a proxy server, instruct a processor of the proxy server to perform acts comprising:
receiving, over a network, a request for communication with a remote resource from an active content module executing on a first client device;
denying the request for communication with the remote resource based, at least in part, on determining that the first client device is not registered with the proxy server;
determining that a business rule associated with a second client device is present based, at least in part, on determining that the second client device is registered with the proxy server;
determining that communication with the remote resource is allowable based, at least in part, on a network grant, the network grant specifying that the communication use a local area network;
initiating data communications with the remote resource using the local area network;
performing an analysis of at least a portion of the data communications between the active content module and the remote resource; and
determining that the active content module is in compliance with licensing rights associated with data included in the at least the portion of the data communications based at least partly on the analysis.

2. The one or more non-transitory computer-readable storage media of claim 1, wherein denying the request for communication comprises providing, to the first client device, an updated business rule including a restriction on communication between the remote resource and the active content module.

3. The one or more non-transitory computer-readable storage media of claim 1, further comprising:
receiving an identity of the second client device; and
registering the second client device with the proxy server.

4. The one or more non-transitory computer-readable storage media of claim 1, wherein the network grant comprises one or more restrictions on accessing a network resource using a wireless local area network connection, a wireless wide-area network connection, or both.

5. The one or more non-transitory computer-readable storage media of claim 1, wherein the network grant comprises permission to access a network resource using a pre-determined hardware network interface of the second client device.

6. The one or more non-transitory computer-readable storage media of claim 1, wherein the business rule comprises a restriction on the meted communication by the second client device via the proxy server.

7. The one or more non-transitory computer-readable storage media of claim 1, wherein the business rule comprises a restriction on functions of the active content module.

8. The one or more non-transitory computer-readable storage media of claim 1, wherein the business rule comprises a restriction on a quantity of data transferred during a pre-determined interval of time.

9. The one or more non-transitory computer-readable storage media of claim 1, wherein the business rule comprises a restriction on an amount of data that can be transferred based at least in part on a time of day during a particular time period.

10. The one or more non-transitory computer-readable storage media of claim 1, wherein the business rule comprises a restriction on data transfer based at least in part on a location of the second client device.

11. The one or more non-transitory computer-readable storage media of claim 10, wherein the location of the second client device comprises a geographic location.

12. A proxy server configured to perform acts comprising:
receiving, over a network, a request for communication with a remote resource, the request sent from an active content module executing on a first client device;
determining that the first client device is not registered with the proxy server;
denying the request for communication with the remote resource based, at least in part, on determining that the first client device is not registered with the proxy server;
determining that a business rule associated with a second client device is present, the business rule unmodifiable by the second client device, wherein the second client device is registered with the proxy server;

receiving, over a network, a request for communication with a remote resource, the request sent from an active content module executing on a first client device;

determining that the first client device is not registered with the proxy server;

denying the request for communication with the remote resource based, at least in part, on determining that the first client device is not registered with the proxy server;

determining that a business rule associated with a second client device is present, the business rule unmodifiable by the second client device, wherein the second client device is registered with the proxy server;

determining that the communication is allowable based at least in part on a network grant specifying use of a local area network for the communication;

initiating communication with the remote resource using the local area network; and determining that the active content module is in compliance with licensing rights associated with a content included in data traffic between the active content module and the remote resource based, at least in part, on analyzing the communication between the active content module and the remote resource.

13. The proxy server of claim 12, wherein an explicit blocking business rule denies communication for one or more of the first client device or the active content module when the first client device is not located in a specified country.

14. The proxy server of claim 12, wherein the denying the requested communication comprises providing an updated business rule including a restriction on communication to the first client device.

15. The proxy server of claim 12, further comprising receiving an identity of the second client device during registration with the proxy server.

16. The proxy server of claim 12, wherein the network grant identifies that the active content module can access a network resource using at least one of: a wireless local area network connection that is accessible to the second client device, or a wireless wide-area network connection that is accessible to the second client device.

17. The proxy server of claim 12, wherein the network grant comprises permission to access a network resource using a pre-determined hardware network interface of the second client device.

18. The proxy server of claim 12, wherein the business rule comprises a restriction on the requested communication by the second client device via the proxy server.

19. The proxy server of claim 12, wherein the business rule comprises a restriction on functions of the active content module.

20. The proxy server of claim 12, wherein the business rule comprises a restriction on a quantity of data transferred during a pre-determined interval of time.

21. The proxy server of claim 12, wherein the business rule comprises a restriction on data transfer based at least in part on a time of day, a date, or a combination thereof.

22. The proxy server of claim 12, wherein the business rule comprises a restriction on data transfer based at least in part on a location of the second client device.

23. The proxy server of claim 22, wherein the location of the second client device comprises a geographic location.

24. A method performed by one of or more processors configured with instructions to perform acts comprising:

receiving, over a network, a request for communication with a remote resource from an active content module executing on a first client device;

determining that the first client device is not registered with a proxy server;

denying the request, from the active content module executing on the first client device, for communication with the remote resource;

determining that a second client device is registered with the proxy server;

determining that a business rule associated with the second client device is present;

approving the communication with the remote resource based at least partly on a network grant specifying that the communication use a local area network;

initiating data communications with the remote resource using the local area network; and determining that the active content module is in compliance with licensing rights based at least partly on an analysis of at least a portion of the data communications between the active content module and the remote resource.

25. The method of claim 24, the acts further comprising:

receiving a second request for communication with the remote resource from a third client device;

determining that the network grant prohibits the second request for communication; and denying the second request for communication based, at least in part, on the network grant.

26. The method of claim 24, wherein the business rule comprises a limitation on accessing a network resource via a wireless local area network connection, a wireless wide-area network connection or both.

27. The method of claim 24, wherein the business rule comprises a restriction on a quantity of data transferred during a pre-determined interval of time.

28. The method of claim 24, wherein the business rule comprises a restriction on data transfer based at least in part on a model of the second client device.

29. The method of claim 24, wherein the business rule comprises a restriction on data transfer based at least in part on time of day, date, or a combination thereof.

30. The method of claim 24, wherein the business rule comprises a restriction on data transfer based at least in part on a current location of the second client device.

31. The method of claim 30, wherein the second client device is located at a particular geographic location.

32. The method of claim 24, wherein an active content module is capable of calling a networking public interface.

* * * * *